US009239978B2

(12) United States Patent
Friedman et al.

(10) Patent No.: US 9,239,978 B2
(45) Date of Patent: Jan. 19, 2016

(54) READABLE MATRIX CODE

(71) Applicant: EYECONIT LTD., Herzliya (IL)

(72) Inventors: Itamar Friedman, Tel Aviv (IL); Nevo Alva, Karmey Josef (IL); Uriel Peled, Kibbutz Ramat Yohanan (IL)

(73) Assignee: EYECONIT LTD., Herzliya (IL)

( * ) Notice: Subject to any disclaimer, the term of this patent is extended or adjusted under 35 U.S.C. 154(b) by 0 days.

(21) Appl. No.: 14/613,513

(22) Filed: Feb. 4, 2015

(65) Prior Publication Data

US 2015/0220827 A1    Aug. 6, 2015

Related U.S. Application Data

(63) Continuation of application No. 14/116,317, filed as application No. PCT/IL2012/050410 on Oct. 16, 2012, now Pat. No. 8,978,989.

(60) Provisional application No. 61/601,042, filed on Feb. 21, 2012.

(51) Int. Cl.
*G06K 19/06* (2006.01)

(52) U.S. Cl.
CPC .... *G06K 19/06103* (2013.01); *G06K 19/06037* (2013.01)

(58) Field of Classification Search
CPC ... G06K 9/00; G06K 15/00; G06K 19/06103; G06K 19/06037
USPC .......................................... 235/492, 494, 375
See application file for complete search history.

(56) References Cited

U.S. PATENT DOCUMENTS

| 5,726,435 A | 3/1998 | Hara et al. |
| 8,144,922 B2 | 3/2012 | Kawabe et al. |
| 2007/0189579 A1 | 8/2007 | Crookham et al. |
| 2008/0002853 A1 | 1/2008 | Kawabe et al. |
| 2009/0057420 A1 | 3/2009 | Onoda et al. |

(Continued)

FOREIGN PATENT DOCUMENTS

| JP | 2007034998 | 2/2005 |
| JP | 2007241328 | 9/2007 |
| JP | 2009230729 | 8/2009 |
| KR | 20110006645 | 6/2011 |

OTHER PUBLICATIONS http://www.design-it.com Feb. 20, 2012.

(Continued)

*Primary Examiner* — Allyson Trail
(74) *Attorney, Agent, or Firm* — Eaton & Van Winkle LLP; Robert D. Katz, Esq.

(57) ABSTRACT

A method of generating a readable matrix code image encoding a message based on an input image and a readable matrix coding specification, comprising: calculating function areas readable to comply with a function patterns specification; determining an extent of free cells and derived cells according to a code word specification; calculating decode input values for free cells such that the appearance of the free cells compared to respective areas of the input image complies with a visual perceptual similarity criterion and with the code word specification; and calculating decode input values for derived cells based on the free cells decode input values and in compliance with the code word specification.

2 Claims, 10 Drawing Sheets

(56) References Cited

U.S. PATENT DOCUMENTS

2009/0255992 A1   10/2009  Shen
2010/0245123 A1    9/2010  Prasad et al.
2014/0124572 A1*  5/2014  Khorsheed et al. ........... 235/375
2014/0185589 A1    7/2014  Baldemair et al.

OTHER PUBLICATIONS http://research.swtch.com/qart Dec. 4, 2012.
http://hackaday.com/2011/08/11/how-to-put-your-logo-in-a-qr-code/ Nov. 8, 2011.

* cited by examiner

READABLE MATRIX CODE

CROSS-REFERENCE TO RELATED APPLICATIONS

This is a continuation of U.S. patent application Ser. No. 14/116,317, filed Nov. 7, 2013, which is a 371 of PCT/IL2012/050410, filed Oct. 16, 2012, which claims priority of U.S. Provisional Patent Application No. 61/601,042, filed Feb. 21, 2012.

FIELD OF THE INVENTION

The present invention is in the field of readable matrix code.

BACKGROUND

One common matrix code is the Quick Response ("QR") Code. QR Code is a registered trademark of Denso Wave of Chita-gun Aichi, Japan. Another common matrix code is the EZcode created by ETH of Zurich, Switzerland, and was exclusively licensed to Scanbuy in 2006 of New York, N.Y.

U.S. Pat. No. 8,144,922 to Kawabe et al discloses a two-dimensional code with a logo, wherein a two-dimensional code that represents information by means of a cell dot distribution pattern formed by having a plurality of cells colored and a logo mark visually representing characters are superimposed. In a preferred embodiment, at least a part of the cell dot color area is smaller than the cell area while the two-dimensional code that represents the information by means of the cell dot distribution pattern that color codes the cells and the logo mark that visually represents the character are superimposed.

US Patent Publication 2009/0255992 to Shen discloses a system for synthesizing a two dimensional code and a logo. The system for generating a synthesized two dimensional code comprises synthesizing means, for synthesizing an original two dimensional code and a visually readable logo to form the synthesized two dimensional code, with at least a part of the visually readable logo being overlapped with the original two dimensional code; identifying means, for reading and identifying the synthesized two dimensional code; and adjusting means, if the synthesized two dimensional code being identified by the identifying means has a code error rate of the synthesized two dimensional code larger than an error correction rate, the adjusting means adjusting the size of the visually readable logo and/or the location of the visually readable logo with respect to the original two dimensional code. According to Shen the proposed invention can be used to integrate enterprise logo(s), brand logo(s) and product logo(s) with a two dimensional code as a whole, which may save areas and achieve better effect for brand and product promotion.

US Patent Publication 2009/0057420 to Onoda et al discloses a clear two-dimensional code which can be merged with an image without giving a user a feeling of disorder when the clear two-dimensional code is attached to the image and in which a readable situation and the like can be arbitrarily set; an article having the clear two-dimensional code attached thereto; a method for printing the two-dimensional code; and a method for displaying the two-dimensional code. Base cells and data cells are arranged in a matrix, and either the base cells or the data cells are clear. The clear two-dimensional code can be read only when a color shown on the clear cells consisting of either the base cells or the data cells and a color shown or non-clear cells consisting of either the base cells or the data cells have a contrast which can be read by a code recognition apparatus designQR® by IT DeSign Inc of Springdale, Ark. offers its users to render a logo or a simple symbol onto a QR Code. According to IT DeSign's web-site (http://www.desgin-it.com/), the designQR® technology searches for the best position in a given QR Code for positioning a logo or symbol over the QR Code. Further according to the web-site, the best position for a logo, is where the dots cell distribution of the said QR Code best resembles the logo in respect to the value read by the corresponding optical reader.

SUMMARY OF THE INVENTION

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operational data can be used by a presently disclosed component(s). By way of example, such operational data can be stored on a tangible computer readable medium. The operational data can be a single data set, or it can be an aggregation of data stored at different locations, on different network nodes or on different storage devices.

The method or apparatus according to the subject matter of the present application can have features of different aspects described above or below, or their equivalents, in any combination thereof, which can also be combined with any feature or features of the method or apparatus described in the Detailed Description presented below, or their equivalents.

According to an aspect of the presently disclosed subject matter, there is provided a method and apparatus for generating a readable matrix code.

In accordance with an aspect of the presently disclosed subject matter, there is provided a method of generating a readable matrix code image encoding a message based on an input image and a readable matrix coding specification. According to examples of the presently disclosed subject matter, the method of generating a readable matrix code image can include: calculating function areas readable to comply with a function patterns specification; determining an extent of free cells and derived cells according to a code word specification; calculating decode input values for free cells such that the appearance of the free cells compared to respective areas of the input image complies with a visual perceptual similarity criterion and with the code word specification; and calculating decode input values for derived cells based on the free cells decode input values and in compliance with the code word specification.

In accordance with an example of the presently disclosed subject matter, the method can further include fusing the input image and each of the calculated functions areas, the free cells, and the derived cells to form a readable matrix code.

In accordance with yet a further example of the presently disclosed subject matter, the method can further include scanning and decoding the readable matrix code to obtain the message.

In accordance with still a further example of the presently disclosed subject matter, the method can also include selecting cells from the free cells as selected cells, wherein the selected cells are cells which are selected from the free cells readable to provide a specified message or a specified part of a message.

In accordance with examples of the presently disclosed subject matter, selecting cells from the free cells can also include assigning decode input values to the selected cells such that the encoded message includes a URL of a network resource.

In accordance with a further example of the presently disclosed subject matter assigning decode input values to the selected cells can include assigning decode input values to the selected cells such that the URL includes a network resource and a key that is associated with the input image or with the readable matrix code.

In accordance with examples of the presently disclosed subject matter, the method can further include implementing a saliency criterion and using the saliency criterion to designate the free cells.

Further in accordance with examples of the presently disclosed subject matter, the method can include using the saliency criterion to determine a portion of the input image to which the matrix code is to be applied; and applying each of the calculating function areas, calculating free cells decode input values and calculating derived cells decode input values based on the portion of the input image to which the matrix code is to be applied.

According to examples of the presently disclosed subject matter, fusing can include processing at least one of the free cells' decode input values and the derived cells' decode input values considering imaging conditions, to thereby adjust at least one decode input value accordingly.

According to examples of the presently disclosed subject matter, fusing comprises calculating pixels values for a group of pixels corresponding to a cell from the calculated free cells or from the calculated derived cells, such that a sub-group of the pixels is assigned with values which are visually similar according to a local visual similarity criterion to pixels from neighboring cells, and the remaining pixels receive values which combine with pixels from the sub-group to provide a valid readable matrix code cell which has the decode input value that is associated with the cell.

In further examples of the presently disclosed subject matter, fusing comprises implementing a tolerance criterion, and wherein the tolerance criterion is used to provide a range of possible values for pixels in the sub-group and/or for the remaining pixels.

In still further examples of the presently disclosed subject matter, fusing comprises calculating pixels values for a group of pixels corresponding to a cell from the free cells or from the derived cells, such that a sub-group of the pixels is assigned with values which are visually similar according to a local visual similarity criterion to pixels from the input image which are associated with the cell, and the remaining pixels which are associated with the cell receive values which when read and processed by a reader device with the pixels in the sub-group, the cell is considered valid and is decoded to provide the decode input value associated with the cell.

In examples of the presently disclosed subject matter, the free cells are data cells and the derived cells are error correction cells, and wherein the error correction decode input values encoded in the error correction cells are derived from the data in the data cells.

In examples of the presently disclosed subject matter, the free cells comprise portions of readable matrix code modules including error correction cells and the derived cells include complementing portions of the modules and of the error correction cells.

In accordance with examples of the presently disclosed subject matter, the free cells are error correction cells and the derived cells are data cells, and wherein the data decode input values encoded in the data cells are derived from the error correction decode input values in the error correction cells.

In accordance with examples of the presently disclosed subject matter, the free cells include one or more of the following: padding cells, border cells and metadata cells.

In accordance with an aspect of the presently disclosed subject matter, there is yet further provided an apparatus for generating a readable matrix code image encoding a message based on an input image and a readable matrix coding specification. According to examples of the presently disclosed subject matter, the apparatus for generating a readable matrix code image can include a memory unit and a processing unit. In examples of the presently disclosed subject matter, the memory unit can be capable of storing the input image and the readable matrix coding specification. The processing unit can be capable of applying a function patterns specification to function areas of the readable matrix code image, applying a code word specification to code word areas of the readable matrix code image, the code word areas including free areas and derived areas in an extent which is in compliance with the code word specification; wherein the free areas include free cells and derived cells, and the processing unit is configured to apply a visual perceptual similarity criterion when processing the free cells, such that the appearance of the free cells, when compared to respective areas of the input image, comply with a visual perceptual similarity criterion, and wherein the processing unit is configured to process the derived cells, such that the derived cells form, together with the free cells, providing a valid code word.

In examples of the presently disclosed subject matter, the processing unit is further configured to fuse the input image and each of the calculated functions areas, the free cells, and the derived cells to form a readable matrix code.

In further examples of the presently disclosed subject matter, the processing unit can be further configured to select cells from the free cells as selected cells, wherein the selected cells are cells which are selected from the free cells readable to provide a specified message or a specified part of a message.

In accordance with an example of the presently disclosed subject matter, the processing unit can be configured to assign decode input values to the selected cells such that the encoded message includes a URL of a network resource.

In further examples of the presently disclosed subject matter, the processing unit can be further configured to assign decode input values to the selected cells such that the URL includes a network resource and a key that is associated with the input image or with the readable matrix code.

Still further by way of example, the processing unit can be configured to implement a saliency criterion and to use the saliency criterion to designate the free cells.

Yet further by way of example, the processing unit can be configured to implement a saliency criterion to determine a portion of the input image to which the matrix code is to be applied, and wherein the processing unit can be configured to calculate decode input values for each of the function areas, free cells and derived cells based on the portion of the input image to which the matrix code is to be applied.

According to examples of the presently disclosed subject matter, as part of the fusing of the input image and each of the calculated functions areas, the free cells, and the derived cells, the processing unit can be configured to process decode input values of at least one of the free cells or derived cells using a robustness criterion that is associated with imaging conditions, to thereby adjust at least one decode input value accordingly.

Further by way of example, as part of the fusing of the input image and each of the calculated functions areas, the free cells, and the derived cells, the processing unit can be configured to calculate pixels values for a group of pixels corresponding to a cell from the calculated free cells or from the calculated derived cells, such that a sub-group of the pixels can be assigned with values which are visually similar according to a local visual similarity criterion to pixels from neighboring cells, and the remaining pixels receive values which combine with pixels from the sub-group to provide a valid readable matrix code cell which has the decode input value that is associated with the cell.

Still further by way of example, as part of the fusing of the input image and each of the calculated functions areas, the free cells, and the derived cells, the processing unit can be configured to implement a tolerance criterion, and wherein the tolerance criterion can be used by the processing unit to provide a range of possible values for pixels in the sub-group and/or for the remaining pixels.

Yet further by way of example, as part of the fusing of the input image and each of the calculated functions areas, the free cells, and the derived cells, the processing unit can be configured to calculate pixels values for a group of pixels corresponding to a cell from the free cells or from the derived cells, such that a sub-group of the pixels is assigned with values which are visually similar according to a local visual similarity criterion to pixels from the input image which are associated with the cell, and the remaining pixels which are associated with the cell receive values which when read and processed by a reader device with the pixels in the sub-group, the cell is considered valid and can be decoded to provide the decode input value associated with the cell.

According to examples of the presently disclosed subject matter, the free cells can be data cells and the derived cells can be error correction cells, and the processing unit can be configured to derive error correction decode input values encoded in the error correction cells from the data in the data cells.

In further examples of the presently disclosed subject matter, the free cells comprise portions of readable matrix code symbols and error correction cells, and wherein the processing unit can be configured to include in the derived cells complementing portions of the symbols and of the error correction cells.

In still further examples, the free cells can be error correction cells and the derived cells can be data cells, and wherein the processing unit can be configured to derive the data decode input values encoded in the data cells from the error correction decode input values in the error correction cells.

According to examples of the presently disclosed subject matter, the processing unit can be configured to include in the free cells one or more of the following: padding cells, border cells and metadata cells.

In some examples of the presently disclosed subject matter, the memory unit can be further capable of storing charge information for enabling charging for the readable matrix code image.

In accordance with an aspect of the presently disclosed subject matter, there is yet further provided a readable matrix code image fusing an input image and a message based on a readable matrix coding specification. According to examples of the presently disclosed subject matter, the readable matrix code image can include function areas and a code word area, and the code word area can include a free cells area and a derived cells area. The function patterns areas can be readable to comply with a function patterns specification. The code word area can be readable to comply with a code word specification, and the code word area can include the free cells area and the derived cells area, wherein the free cells area and the derived cells area are provided in an extent which is in compliance with the code word specification. The free cells area can represent free cells' whose appearance, when compared to respective areas of the input image, complies with a visual perceptual similarity criterion. The derived cells area can form, together with the free cells area, a valid code word.

According to examples of the presently disclosed subject matter, the readable matrix code image can further include a selected cells area. For example, the selected cells area can be readable matrix code cells which are selected from the free cells, and the selected cells areas are readable to provide a specified message or a specified part of a message.

By way of example, the specified message or the specified part of a message that can be encoded in the selected cells area includes a URL of a network resource.

Further by way of example, the specified message or the specified part of a message that can be encoded in the selected cells area includes a URL of a network resource and a key that can be associated with the input image or with the readable matrix code.

According to yet further examples of the presently disclosed subject matter, for a group of pixels corresponding to a free cell or to a derived cell, pixel values can be provided, such that a sub-group of the pixels has values which are visually similar according to a local visual similarity criterion to pixels from neighboring cells, and the remaining pixels of the cell providing values which combine with pixels from the sub-group to provide a valid readable matrix code cell which has a decode input value that is associated with the cell.

In still further examples of the presently disclosed subject matter, for a group of pixels corresponding to a cell from the free cells or from the derived cells, pixels values can be calculated, such that a sub-group of the pixels has values which are visually similar according to a local visual similarity criterion to pixels from the input image which are associated with the cell, and the remaining pixels which are associated with the cell have values which when read and processed by a reader device with the pixels in the sub-group, yield a valid readable matrix code cell.

In examples of the presently disclosed subject matter, the free cells area can correspond to data cells and the derived cells area can correspond to error correction cells, and wherein error correction decode input values encoded in the derived cells area can be derived from the data decoded in the free cells area.

In further examples, the free cells areas can encode portions of readable matrix code modules including error correction cells and the derived cells areas can encode complementing portions of the modules and of the error correction cells.

In yet further examples, the free cells area can encode error correction data and the derived cells area can encode data, and wherein data decode input values encoded in the derived cells area can be derived from the decode input values encoded in the free cells area.

In examples of the presently disclosed subject matter, one or more portions of the free cells area can be associated with one or more of the following: padding cells, border cells and metadata cells.

In accordance with an aspect of the presently disclosed subject matter, there is yet further provided a program storage device readable by machine, tangibly embodying a program of instructions executable by the machine to generate a readable matrix code image encoding a message based on an input image and a readable matrix coding specification. According to examples of the presently disclosed subject matter, the program storage device can tangibly encode instructions for: providing function areas readable to comply with a function patterns specification; providing code word areas readable to comply with a code word specification, the code word areas including free areas and derived areas in an extent which is in compliance with the code word specification; wherein the free areas include free cells whose appearance, when compared to respective areas of the input image, comply with a perceptual similarity criterion, and wherein the derived cells form, together with the free cells, a valid code word.

In accordance with an aspect of the presently disclosed subject matter, there is yet further provided a computer program product comprising a computer useable medium having computer readable program code embodied therein for causing the computer to generate a readable matrix code image encoding a message based on an input image and a readable matrix coding specification. In examples of the presently disclosed subject matter, the computer useable medium can include: computer readable program code for causing the computer to provide function areas readable to comply with a function patterns specification; computer readable program code for causing the computer to provide code word areas readable to comply with a code word specification, the code word areas including free areas and derived areas in an extent which is in compliance with the code word specification, wherein the free areas include free cells whose appearance, when compared to respective areas of the input image, comply with a perceptual similarity criterion, and wherein the derived cells form, together with the free cells, a valid code word.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
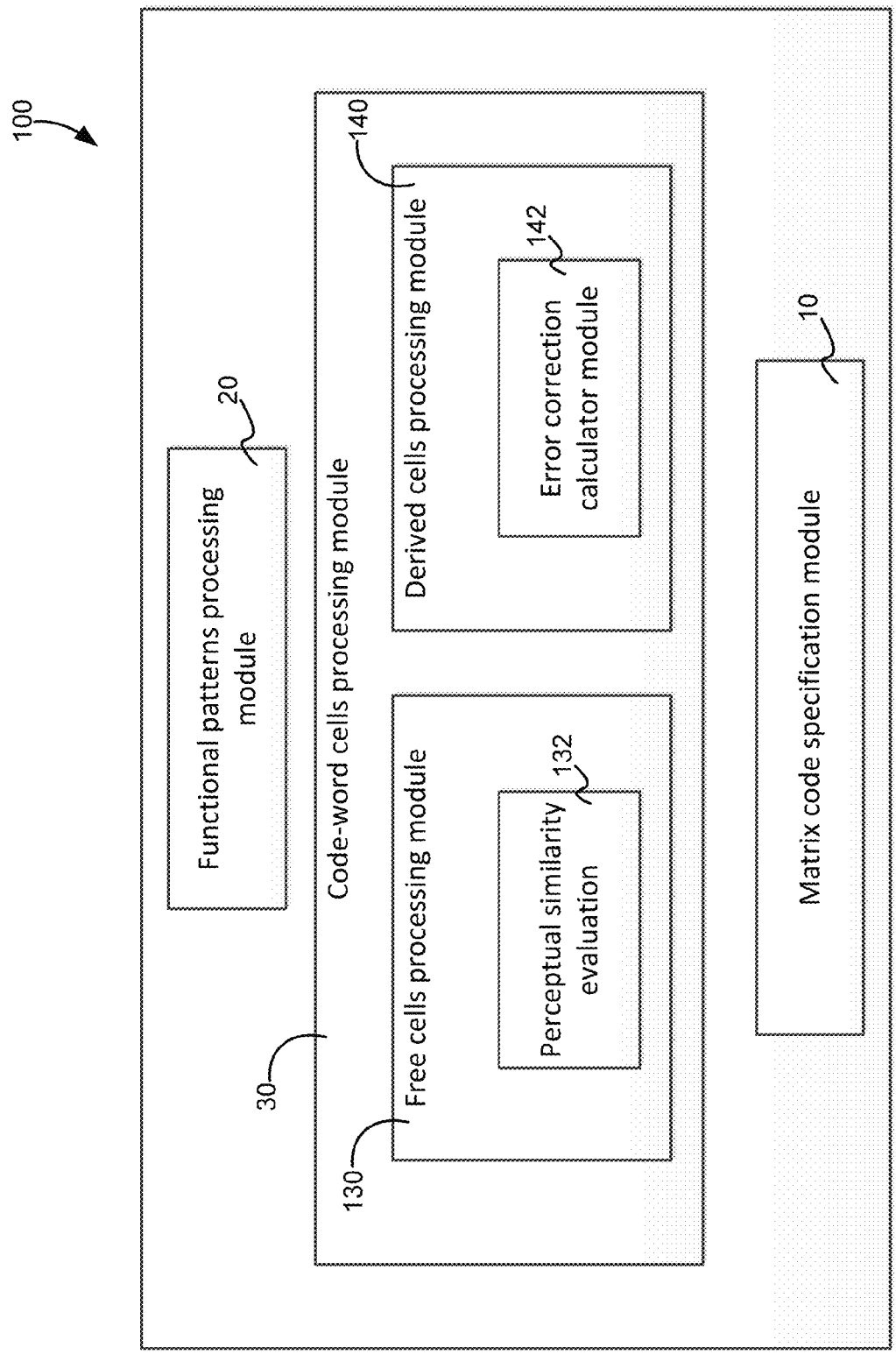
FIG. 1 is a block diagram illustration of a device for generating a readable matrix code representation, according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without some of these specific details. In other instances, well-known methods, procedures and components have not been described in detail so as not to obscure the presently disclosed subject matter.

Unless specifically stated otherwise, as apparent from the following discussions, it is appreciated that throughout the specification discussions various functional terms refer to the action and/or processes of a computer or computing device, or similar electronic computing device, that manipulate and/or transform data represented as physical, such as electronic, quantities within the computing device's registers and/or memories into other data similarly represented as physical quantities within the computing device's memories, registers or other such tangible information storage, transmission or display devices.

According to an aspect of the presently disclosed subject matter there is provided a method of generating a readable matrix code representation. According to a further aspect of the presently disclosed subject matter there is provided an encoded image fusing an input image and a message according to a readable matrix coding specification. Yet according to a further aspect of the presently disclosed subject matter there is provided an apparatus for generating a readable matrix code representation. According to yet another aspect of the presently disclosed subject matter there is provided a program storage device readable by machine, tangibly embodying a program of instructions executable by the machine to perform a method of generating a readable matrix code representation image encoding a message based on an input image and a readable matrix coding specification. In still a further aspect of the presently disclosed subject matter there is provided a computer program product comprising a computer useable medium having computer readable program code embodied therein computer readable program code for causing the computer to generate a readable matrix code image encoding a message based on an input image and a readable matrix coding specification.

According to examples of the presently disclosed subject matter, the method of generating a readable matrix code representation can include: obtaining a message, an input image and a readable matrix coding specification. Calculating function areas readable to comply with a function patterns specification; determining an extent of free cells and derived cells according to a code word specification; calculating values for free cells such that the appearance of the free cells compared to respective areas of the input image complies with a visual perceptual similarity criterion and with the code word specification; and calculating values for derived cells based on the free cells values and in compliance with the code word specification.

Throughout the description and the claims, reference is made to the term "readable matrix code". The term readable matrix code is known in the art of optical machine-readable coding, and the following definition is provided as a non-limiting example only for convenience purposes. Accordingly, the interpretation of the term readable matrix code in the claims, unless stated otherwise, is not limited to the definitions below and the term should be given its broadest reasonable interpretation. The term readable matrix code as used herein relates to an optical machine-readable representation of data in the form of a two-dimensional pattern of symbols. Examples of known matrix code types include: QR-Code, EZcode and DataMatrix.

Different matrix code types are associated with different respective readable matrix code specifications. The term readable matrix code specification is known in the art of optical machine-readable coding, and the following definition is provided as a non-limiting example only for convenience purposes. Accordingly, the interpretation of the term readable matrix code specification in the claims, unless stated otherwise, is not limited to the definitions below and the term should be given its broadest reasonable interpretation. The term readable matrix code specification as used herein relates to a framework of specifications which collectively define various aspects relating to the visual appearance of an object that has some code that is visually encoded in the object in the form of a visual matrix code. By way of example, a readable matrix code specification can include some or all of the following: a general matrix specification, a basic cell specification, a function (such as finder) patterns specification, a code word area specification, a free cells specification, a derived cells specification and a selected cells specification.

Based on a given readable matrix code specification, a compatible decoder can be designed and operated to allow identification, scanning and decoding of visual objects that include compatible matrix code.

It should be noted that some matrix coding specifications include tolerances or variations and allow for the appearance of the cells and/or of the two-dimensional patterns to have different appearances or to shift within a certain range without rendering the matrix code unreadable. For example, some types of readable matrix code specifications can include: different coding modes, different masks, reflectance reversal, mirror imaging etc., and a message can be associated with different matrix codes representations, for example according to the different modes, masks, etc., and each of the different representations can be compatible with the readable matrix code specification. It would be appreciated that throughout the present disclosure and in the claims, the term tolerance encompasses also a negative tolerance which can be effective for limiting a certain range of values which is suggested or required for cells or patterns that are part of a readable matrix code.

Furthermore, it should be noted, that some scanners, imagers, readers and/or decoders allow certain tolerances and/or deviations from the readable matrix code specification as will be further explained below.

Accordingly, in some examples of the presently disclosed subject matter, the term readable matrix code can refer to a matrix code that is compatible with a respective readable matrix code specification, and in further examples of the presently disclosed subject matter, the term readable matrix code can be a representation of a matrix code that is readable according to a certain matrix code specification that is configured, adapted or adjusted in accordance with the specific characteristics of a given scanner, reader or decoder any combinations thereof, or even to a general characteristic of scanners, readers or decoders. In the latter case, the readability or eligibility of the matrix code is determined according to the ability, possibly the de-facto ability, of a certain decoding device or devices to decode a given matrix code representation that is generated based on a given readable matrix code specification and the tolerances and/or deviations that are supported or corrected by the decoding device or devices.

For example, the QR-Code specification (used here as an example of a readable matrix code specification) defines the color values of cells as dark and light. By way of example, a QR-Code scanner, that is a matrix code scanner that is configured to scan and decode matrix codes that are compatible with the QR-Code specification, can convert an image which includes dark and light colors which represent a matrix code to a set of dark and light pixels using a global threshold, and thus the colored image provides a readable matrix code. By way of example, the global threshold that is implemented by the QR-Scanner can be determined by taking a reflectance value midway between the maximum reflectance and minimum reflectance in the image. This means that an image which represents a readable matrix code, according to examples of the presently disclosed subject matter, can have a wide range of color choices for areas which represent readable matrix code cells for which the readable matrix code specification suggests a light or a dark value.

In this sense, according to examples of the presently disclosed subject matter, a matrix code can be considered to be a readable matrix code, even when the colors that are used in the matrix code or in the image which represents the matrix code are not explicitly, in and of themselves, compatible with the corresponding readable matrix code specification, but are such that when read and processed by the reader/decoder the resulting color values are compatible with the readable matrix code specification. In such cases, the colors that are used in the matrix code or in the image which represents the matrix code can be based on the readable matrix code specification, but additional processing can be applied to take advantage, inter-alia, of the tolerances, characteristics, configurations and/or capabilities of the decoders, scanners or imagers, (or any other equipment that is used to process an image and decode a matrix code therefrom), such that the values that are calculated for the matrix code provide a certain level (e.g., the highest possible) of visual perceptual similarity to respective areas of an input image, while meeting, de-facto, following imaging, scanning, processing, etc. the requirements of the readable matrix code specification.

In another example, the QR-Code specification suggests that a reader apparatus reads and defines the colors of certain cells or areas of a QR-Code representation by sampling a small group of pixels around the center of each cell and comparing the sampled values to the global threshold. This means that in certain cells it is not necessary that all pixels will meet the conditions that are suggested or required by the readable matrix code specification with respect to the global threshold, and the colors of the matrix code representation can be varied, such that through the imaging or processing of the captured image, the resulting colors of the cells are compatible with the QR-Code specification, and thus the matrix code representation is considered according to examples of the presently disclosed subject matter to be a readable matrix code or in this particular example, a readable QR-Code.

In yet another example, the QR-Code specification includes a tolerance with respect to the width of certain function patterns (which are sometimes also referred to as the "modules"), such as the finder pattern, and certain cells (which are sometimes also referred to as "modules"). The terms "function pattern", modules" and "function cells" are used herein interchangeably. Therefore, for example, when a reader apparatus reads and localizes the finder patterns it can be configured to search for a range of frequency patterns. Thus, readable matrix code specifications which support this feature can allow some freedom with regard to the width and height of the function pattern, within the tolerance, and a matrix code which includes functions areas, which represent function patterns, whose width and height are within the allowed range can be regarded as a readable matrix code and compatible with the corresponding readable matrix code specification.

In still another example, the QR-Code specification supports an error correction feature. The QR-Code images include error symbols, and each error correction symbol includes one or more error correction cells, which together form the error correction symbol. The error correction symbols (and the error correction cells which constitute the symbols) enable a certain amount of errors when reading and determining the cell values. According to examples of the presently disclosed subject matter, a QR-Code can be generated which, intentionally, or as a result of the process of generating a readable matrix code representation, according to examples of the presently disclosed subject matter, includes certain errors which can be corrected using the redundant data (e.g., the error correction data) that is included in the QR-Code. Thus, according to examples of the presently disclosed subject matter, when a reader apparatus reads and decodes the image which represents readable matrix code, the errors can be corrected using the included redundant data, and the matrix code with the included errors is thus considered a valid and readable matrix code.

Throughout the description and the claims, reference is made to the terms "decoding device" (or "decoder" in short), "matrix code reader" (or "reader" in short), "matrix code scanner" (or "scanner" in short) or the like. Unless specifically stated otherwise, or if it is apparent from the description the terms "decoding device" (or "decoder" in short), "matrix code reader" (or "reader" in short), "matrix code scanner" (or "scanner" in short) and the like are used interchangeably. The terms decoding device, matrix code reader and matrix code scanner are known in the art of optical machine-readable decoding, and the following definition is provided as a non-limiting example only for convenience purposes. Accordingly, the interpretation of the terms decoding device, matrix code reader and matrix code scanner in the claims, unless stated otherwise, is not limited to the definitions below and the term should be given its broadest reasonable interpretation. The terms decoding device, matrix code reader and matrix code scanner as used herein relate to an electronic device which is used in the process of detecting, imaging, scanning and/or decoding of a an image which represents a matrix code. It would be appreciated that such devices can be configured to operate according to one or more readable matrix codes specifications. As described above, according to examples of the presently disclosed subject matter, a given decoding device, matrix code reader and matrix code scanner can include various features and/or capabilities and/or configurations that can have an effect on the code matrix values that are assigned to areas of an image which correspond to different matrix code cells. By this effect, areas of the image which do not "appear" to be compatible to a corresponding readable matrix code specification, can be "turned" into valid values according to the readable matrix code specification. Thus, according to examples of the presently disclosed subject matter, a readable matrix code can be generated based on the readable matrix code specification and also based on the characteristics and/or configurations of the reading and processing hardware and software which can be used to scan, read and/or decode various images that represent matrix codes that include various variations relative to the readable matrix code specification, and such devices (hardware or software) either by design or as a side effect of their characteristics and/or configurations can render the image into a readable matrix code that is compatible with a readable matrix code specification.

In this regard, as mentioned above, it would be appreciated that the matrix code or the method or device for generating a matrix code according to examples of the presently disclosed subject matter, can be tuned or configured according to the characteristics of a given scanner, reader or decoder and any combination thereof, or a group of such scanners, reader or decoder, or according to the characteristics and/or configuration of a group of such devices (or software modules) or it can even be configured according to a general characteristic or configuration of scanners, readers or decoders. It would be appreciated, that according to examples of the presently disclosed subject matter, a representation in an image of a matrix code should be considered as a readable matrix code according to a corresponding readable matrix code specification, when taking into account the characteristics and/or the configuration of the scanner, reader or decoder, and the various features and tolerances in the readable matrix code specification which allow some extent of flexibility with respect to the values of the different matrix code cells.

Throughout the description and the claims, reference is made to the term "input image". The term input image is known in the art of optical machine-readable coding, and the following definition is provided as a non-limiting example only for convenience purposes. Accordingly, the interpretation of the term input image in the claims, unless stated otherwise, is not limited to the definitions below and the term input image should be given its broadest reasonable interpretation. The term input image as used herein relates to a digital representation of a two-dimensional figure, such as a painting, photograph, map, chart, drawing or print. According to examples of the presently disclosed subject matter, the input image complies with the basic requirements that are set forth by the readable matrix coding specification. For example, the dimensions of the input image may be required to be in compliance with the requirement set forth in the readable matrix coding specification.

It would be appreciated that the matrix coding specification can support a variety of different sizes and dimensions and the input image can have dimensions which match any one of the supported dimensions. Further, the dimensions of the input image can be different from any of the preferred dimensions which are set forth in the readable matrix code specification.

For example, in such cases where the input image's dimensions are different from any of the preferred dimensions which are set forth in the readable matrix code specification, the input image can be re-sampled to fit the preferred dimensions. Furthermore, even without such re-sampling, in some examples of the presently disclosed subject matter, the tolerance presented by the readable matrix code specification and the reading process performed by a matrix code reader apparatus can be taken advantage of. For example, the cells' dimensions tolerance can be exploited by altering the specification's suggested dimensions of few cells, such that the final matrix code dimensions will fit to the input image one.

It would also be appreciated that the input image that is used in examples of the presently disclosed subject matter is some version of an original image which was modified in order to prepare a matrix code representation for processing according to examples of the presently disclosed subject matter. For example, the original image can have certain dimensions which are not supported or suggested by the readable matrix coding specification, and the original image can be cropped or resized manually or automatically using some predefined cropping or resizing algorithm so that the dimensions of the modified input image are supported or suggested by the readable matrix coding specification.

It would also be appreciated that some readable matrix code specifications can require or suggest that cells of the readable matrix code be of an integer width and/or height, while the tolerance presented by the matrix code specification and the reading process performed by some matrix code readers can enable the creation of a readable matrix code with non-integer cells' measures, for instance by sharing a certain border pixel between two cells, or re-sampling the matrix code. In addition, according to examples of the presently disclosed subject matter, an original image can undergo pre-processing before being fed to the process or device according to examples of the presently disclosed subject matter, whereby, for example, the original image can be re-sampled and its dimensions can be adjusted according to at least one of the dimensions that are supported or suggested by a readable matrix code specification.

According to examples of the presently disclosed subject matter the input image can be part of the original image, and the readable coding matrix resulting from the process according to examples of the presently disclosed subject matter can be combined with the part of the original image that completes the input image. Thus for example, the result can be a readable matrix code representation surrounded by and "merged" with the unprocessed part of the original image.

It should also be appreciated, that the input image, in its original form can be in any form or format which can be converted to a digital visual representation, e.g., a digital image or a file which represents a digital image. Examples of types of visual representation which can be the source of the input image can include: prints, digital images, impressions, holograms, text, text representation of images, etc.

Throughout the description and the claims, reference is made to the term "output image". The term output image is known in the art of optical machine-readable coding, and the following definition is provided as a non-limiting example only for convenience purposes. Accordingly, the interpretation of the term output image in the claims, unless stated otherwise, is not limited to the definitions below and the term output image should be given its broadest reasonable interpretation. Some aspects of the term input image are defined by some of the features of the process that is disclosed herein and will be apparent from the disclosure. In addition, it should be noted that the output image can be a digital representation of a readable matrix code as is described below. It should also be appreciated that the input image and the output image can be presented in various forms including, but not limited to: pixels on at least one digital visual display, print parameters for configuring a digital printer to print an image which corresponds to the digital representation of the readable matrix code which constitutes the output image, vectors on at least one digital visual display, color frequencies on at least one digital visual display, etc. According to examples of the presently disclosed subject matter, the output image, in whatever form, represents a readable code matrix, and different areas in the output image represent individual cells or patterns or the readable code matrix. Accordingly, the output image enables an imager, scanner and/or decoder to convert the image to cells of a matrix code in manner to allow decoding of the output image according to a corresponding readable matrix code specification.

Throughout the description and the claims, reference is made to the term "function patterns", "function modules" or "function cells" which are used herein interchangeably. The terms, function pattern, function module or function cells, are known in the art of optical machine-readable coding, and the following definition is provided as a non-limiting example only for convenience purposes. Accordingly, the interpretation of the term function pattern, function module or functions cell in the claims, unless stated otherwise, is not limited to the definitions below and should be given its broadest reasonable interpretation. Function pattern, function module or function cell as used herein relate to a group of matrix code cells that are defined in a corresponding readable matrix code specification and which serve a predefined ancillary function which can be used in the imaging, scanning and/or decoding process of the message that is encoded in the readable matrix code. For example, function patterns can be used for indicating the location of the readable matrix code or to specify certain characteristics of the readable matrix code. For example the QR-Code specification includes provisions for the following function patterns: finder, separator, timing patterns, and alignment patterns.

Throughout the description and the claims, reference is made to the term "encoding region". The term encoding region is known in the art of optical machine-readable coding, and the following definition is provided as a non-limiting example only for convenience purposes. Accordingly, the interpretation of the term encoding region in the claims, unless stated otherwise, is not limited to the definitions below and should be given its broadest reasonable interpretation. The term encoding region as used herein relates to a region of the readable matrix code that is not occupied by function patterns and is available for encoding of data and error correction code words, and for metadata cells, which provide necessary or optional information about the format, version and other characteristics of the encoded data.

Throughout the description and the claims, reference is made to the term "code word" or "code words". The terms code word or code words are known in the art of optical machine-readable coding, and the following definition is provided as a non-limiting example only for convenience purposes. Accordingly, the interpretation of the term code word in the claims, unless stated otherwise, is not limited to the definitions below and should be given its broadest reasonable interpretation. The term code word as used herein relates to a bit stream that is used in a readable matrix code to structure a code message into words. A readable matrix code specification usually suggests (or requires) a certain structure for the code word or enables a selection of one of a plurality of predefined structures. For example, in the QR-Code specification a word is usually defined by an 8-bit array. A code word can structure a data bit stream, an error correction bit stream, both data and error correction bit streams and can include metadata.

The final code word is usually comprised of a set of code words and possibly some metadata that are to be encoded in the encoding region of the readable matrix code. By way of example the final code word can include data code words, error correction code words, and metadata.

Throughout the description and the claims, reference is made to the term "free cells". The term free cells as used herein relates to code word cells (cells which are included in the code word), and more specifically to the code word cells that can receive any valid value according to the readable matrix code specification. According to examples of the presently disclosed subject matter, the values for at least some of the free cells can be calculated according to an appearance of respective areas of an input image with which the readable matrix code is associated.

It should be appreciated that for code word cells, including for free cells, a general cell specification (which is part of the readable matrix code specification) can define a valid value as either dark or light, i.e., the values for the code word cells are binary. Furthermore, in some readable matrix code specifications, the value of a cell can be modified in the decoding process, for example, by applying a mask to the readable matrix code during the decoding process. Accordingly, the values that are calculated for the different cell types as part of the process of generating a readable matrix, according to examples of the presently disclosed subject matter, are based on, inter-alia, the values (e.g., the dark/light binary values) which are set forth by the readable matrix code specification, when the readable matrix code is provided as input to the decoder. It should be appreciated that in some readable matrix code specifications, more than two valid values are defined.

As mentioned above, the general cell specification of the readable matrix code specification can set forth a definition of a valid value. Such a value is termed herein a "decode input value". By way of example a valid value for a cell according to the general cell specification is a binary value, i.e., the cell is required to be either dark or light. As mentioned above, the decode input value can be modified in the decoding process, for example, by a mask that is applied to the readable matrix code in the decoding process. In such cases, the value of interest for the process of generating a readable matrix code according to examples of the presently disclosed subject matter, is the value at the input to the decoder, which is not necessarily the same as the value after decoding (e.g., due to use of masking in the decoding process). It would be also appreciated, that some decoders can implement preprocessing of the readable matrix code and other operations which are intended to prepare the readable matrix code for the actual decoding. The decode input values which are referred to herein are the values which are received after such preprocessing, if exists. It should be appreciated that in some readable matrix code specifications, more than two valid values are defined. Therefore, for example, the decode input value may be of a ternary type (or of any other N values type).

According to examples of the presently disclosed subject matter, the values that are calculated for some of the cells of the readable matrix code can be color values and/or luminosity values. As will be described in further detail below, the process of generating a readable matrix code according to examples of the presently disclosed subject matter, can be used to determine, for different cells of a readable matrix code (e.g. for the pixel or pixels which represent the cells), the color and/or luminosity values that can be used to represent the decode input values of the cells. As will also be described below, the process of generating a readable matrix code according to examples of the presently disclosed subject matter can be configured to take into account certain characteristics, configurations and/or capabilities of the imager, scanner and/or decoder (or a device which combines these functions) that are used in the process of capturing a representation of the readable matrix code, scanning the readable matrix code and/or preparing it for decoding, to expand the possible range of values which can be used for representing some of the cells of the readable matrix code beyond the range of valid decode input values, including using a range of color and/or luminosity values for the pixels which represent the cells. The process of generating a readable matrix code according to examples of the presently disclosed subject matter, can be used to allow a certain level of freedom with regard to the appearance of some areas of a readable matrix code representation, while meeting the requirements of the readable matrix code specification at the decode starting point, to allow for an appearance which has a certain visual similarity to the input image. Further by way of illustration, according to examples of the presently disclosed subject matter, the decode input values which are associated with the free cells are essentially a result of the process of generating a readable matrix code that is described herein, and the values for the free cells are essentially not limited by a certain target set of decode input values.

Furthermore, according to examples of the presently disclosed subject matter, assuming that the decode input values which are required/suggested by the readable matrix code specification define a first set of values, the color values and/or luminosity values that are calculated for the areas which represent cells in a readable matrix code according to examples of the presently disclosed subject matter, define a second set of values which is larger than the first set, such that each value in the first set is associated with two or more (e.g., 2, 3, . . . , n) values in the second set. It would be further appreciated that according to examples of the presently disclosed subject matter, the second set can include two or more (e.g., 2, 3, . . . , n) subsets and the values in the first set can be associated with one or more values in each subset of the second set. Thus, for example, a light/dark value from the first set can be associated with a plurality of color values and with a plurality of luminosity values.

Returning now to the definition of the term "free cells" as it is used herein. According to examples of the presently disclosed subject matter, the values for the free cells are valid in the sense that they meet the general cell specification in the readable matrix code specification at the decode start point. For example, the values for the free cells can be calculated based on the requirements and/or suggestions set forth in the general cell specification regarding the valid range of cell values, and for at least some of free cells, the values can be calculated further based on the appearance of respective areas of the input image with which the readable matrix code is associated. Thus, the values for the free cells, can for example include color and/or luminosity values, which, at the decode start point, are translated to dark/light values which are valid according to the readable matrix code.

In this regard, it would be appreciated that based on the readable matrix code specification or based on user or otherwise defined configurations, the values of some of the cells can be restricted or dependent (beyond the restrictions set forth in the general cell specification), and according to examples of the presently disclosed subject matter, such cells are not considered "free cells". For example, free cells include only the code word cells which are not restricted or dependent based on the readable matrix code specification or based on user or otherwise defined configurations (not including the restrictions set forth in the general cell specification), and possibly also include padding cells, and possibly also include some border cells, for which the user or/and a selection based on a predefined criterion or rule are allowed to select the color and/or luminosity values as long as the selected values meet the general cell specification at the decode start point.

In the following description, for convenience and by way of example, free cells are sometimes referred to as being code word cells of a readable matrix code. In some examples of the presently disclosed subject matter, the free cells can also include padding cells and/or border cells which are suggested and/or required by the corresponding readable matrix code specification. In other examples of the presently disclosed subject matter, padding/border cells are not considered free cells and different processing is applied to the free cells and to the padding cells.

According to examples of the presently disclosed subject matter, the general cells specification that is included in the readable matrix code specification can provide the suggestions or requirements with respect to the free cells. The general cells specification includes the basic rules which apply to substantially all the cells in the matrix code and provide the framework of the readable matrix code. For example, the general cells specification can include a requirement that the color values of the cell will be selected from a first set of colors, which is, for example, a relatively small set. Further by way of example, the set of colors that is allowed or suggested according to the general cells specification can be smaller than the set of colors that is used in the process of generating a readable matrix code, in particular for free cells. In some readable matrix code specification the suggested or required set of colors for readable matrix code cells is binary and a decode input value needs to be either dark or light. By way of example, the general cells specification can suggest or require a certain limit with respect to the range of values that a free cell can receive. Accordingly, the free cells can be regarded as free in the sense that they can receive any value that is within the general framework.

As mentioned above, a readable matrix code speciation can include certain tolerances, which can be implemented as part of the process of generating a readable matrix code according to examples of the presently disclosed subject matter. Further by way of example, the tolerances included in the readable matrix code specification can be effective for increasing or decreasing the range of values that free cells can receive in the process of generating a readable matrix code.

Furthermore, the limit on the range of data that can be encoded in the free cells can be associated with characteristics of a given scanner, reader or decoder any combinations thereof, or even to a general characteristic of scanners, readers or decoders. For example, in the process of generating a readable matrix code representation, the range of values that are allowed for the free cells can be determined according to the readable matrix code specification and further in accordance with a characteristic(s) of the scanner/reader/decoder. More specifically, in some examples of the presently disclosed subject matter, the range of allowed values for the free cells that is used in the process of generating a readable matrix code can be adjusted (relative to what is suggested or required in the readable matrix code specification) according to a characteristic(s) of the scanner/reader/decoder.

As would be appreciated, a readable matrix code specification allocates a certain part of the readable matrix code, and more specifically of the code word, for free cells, which for example, allow a user (or some other input message source) to enter specific data that is to be encoded in the readable matrix code. In still further examples, the readable matrix code specification allocates a certain part of the code word for derived cells. Further by way of example, in order to be valid (or readable), the code word of the matrix code needs to include a certain extent of derived cells (e.g., error correction cells), as will be further described herein. In further examples, in addition to free cells and derived cells, the code word of a readable matrix code can also include selected cells, as further discussed herein.

Throughout the description and the claims, reference is made to the term "derived cells". The term derived cells is known in the art of optical machine-readable coding, and the following definition is provided as a non-limiting example only for convenience purposes. Accordingly, the interpretation of the term derived cells in the claims, unless stated otherwise, is not limited to the definitions below and should be given its broadest reasonable interpretation. The term derived cells, as used herein, relates to cells which are part of a code word and whose values are derived from the value of corresponding free cells and according to the readable matrix code specification.

According to examples of the presently disclosed subject matter, derived cells can include error correction data which is derived from corresponding data that is encoded in corresponding free cells. However, in further examples of the presently disclosed subject matter, the derived cells can be the data cells, and the free cells can hold the error correction data. In yet further examples of the presently disclosed subject matter, some of the free cells hold data and other free cells hold error correction data and the derived cells hold error correction data which is associated with (and derived from) the data in the free cells and data that is associated with (and derived from) the error correction data in the free cells.

According to examples of the presently disclosed subject matter, for the derived cells, the decode input values can be first calculated according to the decode input values that are calculated for the free cells, and then, the values for the derived cells (e.g., color and/or luminosity values) can be calculated based the derived cells' decode input values and based on a visual perceptual similarity to the respective areas of the input image.

For example, in QR-Code, the error correction method is based on Reed-Solomon coding. This method produces a systematic binary code which is a subset of a Binary Finite Field, hence it obeys the Binary Finite Field Arithmetic. Accordingly, a simple corresponding arithmetic technique, (such as Gauss-Jordan Elimination) can be used to control (and free) the error correction cells (or some of them) while relinquishing the control of the data cells, which then become derived cells according to examples of the presently disclosed subject matter.

Whether the derived cells hold the data or the complimenting error correction data, according to examples of the presently disclosed subject matter, the values for the derived cells are calculated based on the values of the free cells. As mentioned above, according to examples of the presently disclosed subject matter, the values that are calculated for the derived cells (or for the pixels which represent the derived cells) can be color and/or luminosity values. Further by way of example, the values for the derived cells can be calculated such that in addition to being associated with the values of corresponding free cells, the values are associated with the values set forth in the general cell specification, such that at the decode start point, the values for the derived cells are valid according to the readable matrix code specification.

Throughout the description and the claims, reference is made to the term "metadata cells". The term metadata cells is known in the art of optical machine-readable coding, and the following definition is provided as a non-limiting example only for convenience purposes. Accordingly, the interpretation of the term metadata cells in the claims, unless stated otherwise, is not limited to the definitions below and should be given its broadest reasonable interpretation. The term metadata cells, as used herein, relates to cells in the encoding region which provide necessary or optional information about the format, version and other characteristics of the encoded data. By way of example, the QR-Code specification suggests to include format information cells and version cells, which provide information about cells or symbol characteristics and matrix code version. This information can be used for enabling decoding of the remainder of the encoding region.

According to examples of the presently disclosed subject matter, the values that are calculated for the metadata cells (or for the pixels which represent the derived cells) can be color and/or luminosity values. Further by way of example, the values for the metadata cells can be calculated such that in addition to being associated with the metadata that needs to be encoded in the metadata cells, the values are associated with the values set forth in the general cell specification, such that at the decode start point, the values for the derived cells are valid according to the readable matrix code specification. Further according to examples of the presently disclosed subject matter, the values that are calculated for the metadata cells can also take into account the appearance of the respective areas in the input image.

Throughout the description and the claims, reference is made to the term "selected cells". The term selected cells, as used herein, relates to readable matrix code cells which are selected from amongst the code word cells, and the values for the selected cells are associated with a predefined message that is to be encoded in the selected cells.

According to examples of the presently disclosed subject matter, the selected cells can be a subset of the free cells, but unlike the free cells, the decode input values for the selected cells are not necessarily based on the appearance of respective areas of the input image with which the readable matrix code is associated. Still further according to examples of the presently disclosed subject matter, visual perceptual similarity can be disregarded when the decode input values for the selected cells are determined. However, in yet further examples of the presently disclosed subject matter, the color and/or luminosity values that are calculated for the free cells can take into account the appearance of respective areas of the input image with which the readable matrix code is associated, in addition to the predefined message that is to be encoded in the selected cells, and in addition to the general cell specification.

In examples of the presently disclosed subject matter, the values for the selected cells can be further based on the characteristics and/or configurations of the scanner/reader/decoder that is/are used for processing, inter-alia, the areas corresponding to the selected cells in the output image, such that the values that are assigned to the selected cells are in compliance with the corresponding readable matrix specification.

Thus, for example, for the selected cells, the decode input values can be first calculated according to the message that is to be encoded in the selected cells, and then, the values for the selected cells (e.g., color and/or luminosity values) can be calculated based on the selected cells' decode input values and based on a perceptual similarity to the respective areas of the input image.

Throughout the description and the claims, reference is made to the terms "visual similarity", "perceptual similarity", "visual perceptual similarity" or the like. The terms "visual similarity", "perceptual similarity" or the like are known in the art of optical machine-readable coding, and the following definition is provided as a non-limiting example only for convenience purposes. Accordingly, the interpretation of the term "visual similarity", "perceptual similarity", "visual perceptual similarity" or the like in the claims, unless stated otherwise, is not limited to the definitions below and the terms "visual similarity", "perceptual similarity", "visual perceptual similarity" or the like should be given their broadest reasonable interpretation. The terms visual similarity or perceptual similarity relate to a relationship between an input image and an output image that includes a matrix code which corresponds to at least a portion of the input image, or to a relationship between a certain part of an input image and a corresponding matrix code which at least to a part of comparative measure.

According to examples of the presently disclosed subject matter, a relationship between the input image and the output image or between certain parts of the two images can be measured using one or more visual similarity measures. One example for such a visual similarity measure can be an L-norm distance between color values of the corresponding pixels within the two images. A PSNR over MSE measure can be used between the intensity levels of the corresponding pixels. Another example for such a perceptual similarity measure is an L-norm distance measured between edge descriptors of fitting salient areas. Yet a further example of a perceptual similarity measure that can be used is the structural similarity index measure (SSIM), which incorporates loss of correlation, luminance distortion and contrast distortion measures. Moreover, additional computer vision techniques such as saliency detection, object detection, object recognition can be incorporated in such visual perception measures.

In some examples of the presently disclosed subject matter, threshold or criteria can be used as part of the process of calculating values for certain cells (e.g. free cells, derived cells, selected cells) and can set forth a certain level of similarity (e.g., a score) above which a cell is considered to provide a target perceptual similarity to a corresponding area of an input image. Such criteria or threshold can be used to achieve a sufficient level of perceptual similarity as part of an optimization function which searches for values that meet a perceptual similarity threshold or criterion possibly taking into account other goals, constraints or targets.

Reference is now made to FIG. 1, which is a block diagram illustration of a device for generating a readable matrix code representation image, according to examples of the presently disclosed subject matter. According to examples of the presently disclosed subject matter, a device 100 for generating a readable matrix code representation image can include: a matrix code specification module 10, a functional patterns processing module 20 and a code-word processing module 30.

In examples of the presently disclosed subject matter, code-word processing module 30 can include a free cells processing module 130 and a derived cells processing module 140. The free cells processing module 130 can include a perceptual similarity evaluation module 132, and the derived cells processing module 140 can include an error correction calculation module 142.

An example of the operation of the device for generating a readable matrix code representation image 100 shown in FIG. 1 shall be discussed in further detail below. Before continuing with the description of the device for generating a readable matrix code representation image 100 shown in FIG. 1, there is now provided a description of possible implementations of the device for generating a readable matrix code representation image 100 shown in FIG. 1 on computer hardware.

According to examples of the presently disclosed subject matter, the device for generating a readable matrix code representation image 100 of FIG. 1 can be implemented on a general purpose computer or on a special purpose computer. In another examples of the presently disclosed subject matter, the device for generating a readable matrix code representation image 100 of FIG. 1 the components of the computer can be combined with components of the device for generating a readable matrix code representation image 100 shown in FIG. 1 to form a special purpose computer. For example, the components of the device for generating a readable matrix code representation image 100 of FIG. 1 can be realized by running a computer readable software code on a general purpose computer hardware.

Figure 2:
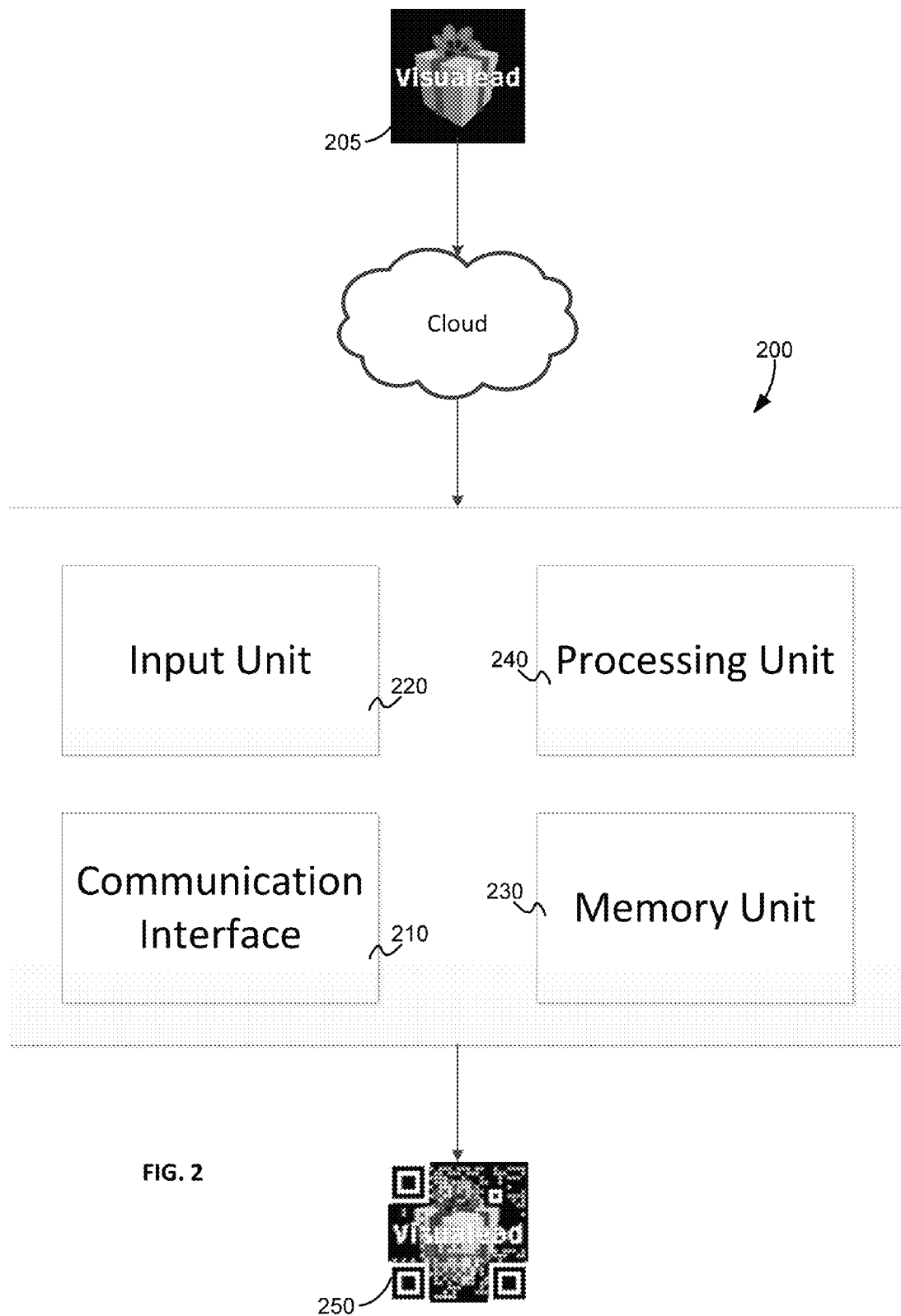
FIG. 2 is a block diagram illustration of computer which may be used to generate a readable matrix code representation, according to examples of the presently disclosed subject matter.

Reference is now made to FIG. 2, which is a block diagram illustration of computer which may be used to generate a readable matrix code image, according to examples of the presently disclosed subject matter. According to examples of the presently disclosed subject matter, the computer 200 can include a communication interface 210, such as a modem, an input unit 220, such as an IO interface, a memory unit 230, such as RAM memory, and a processing unit 240, such as a CPU. The computer 200 can receive an input image 205, e.g., through the cloud, and can process it to provide a readable matrix code 250, possibly in the form of a digital image, or in any other suitable form. The readable matrix code 250 can be communicated to a destination, possibly a remote destination which can be the source of the input image or any other remote computer, or the readable matrix code 250 can be stored locally in the computer 200. As mentioned above, the computer 200 can implement the components of the device 100 shown in FIG. 1.

It should be appreciated that the computer shown in FIG. 2 and described here with reference to FIG. 2, and/or the device shown in FIG. 1 and described here with reference to FIG. 1 can be a distributed device, which includes several components which reside on different devices and are controlled by a control layer as a virtual entity to perform the operations described herein.

Figure 3:
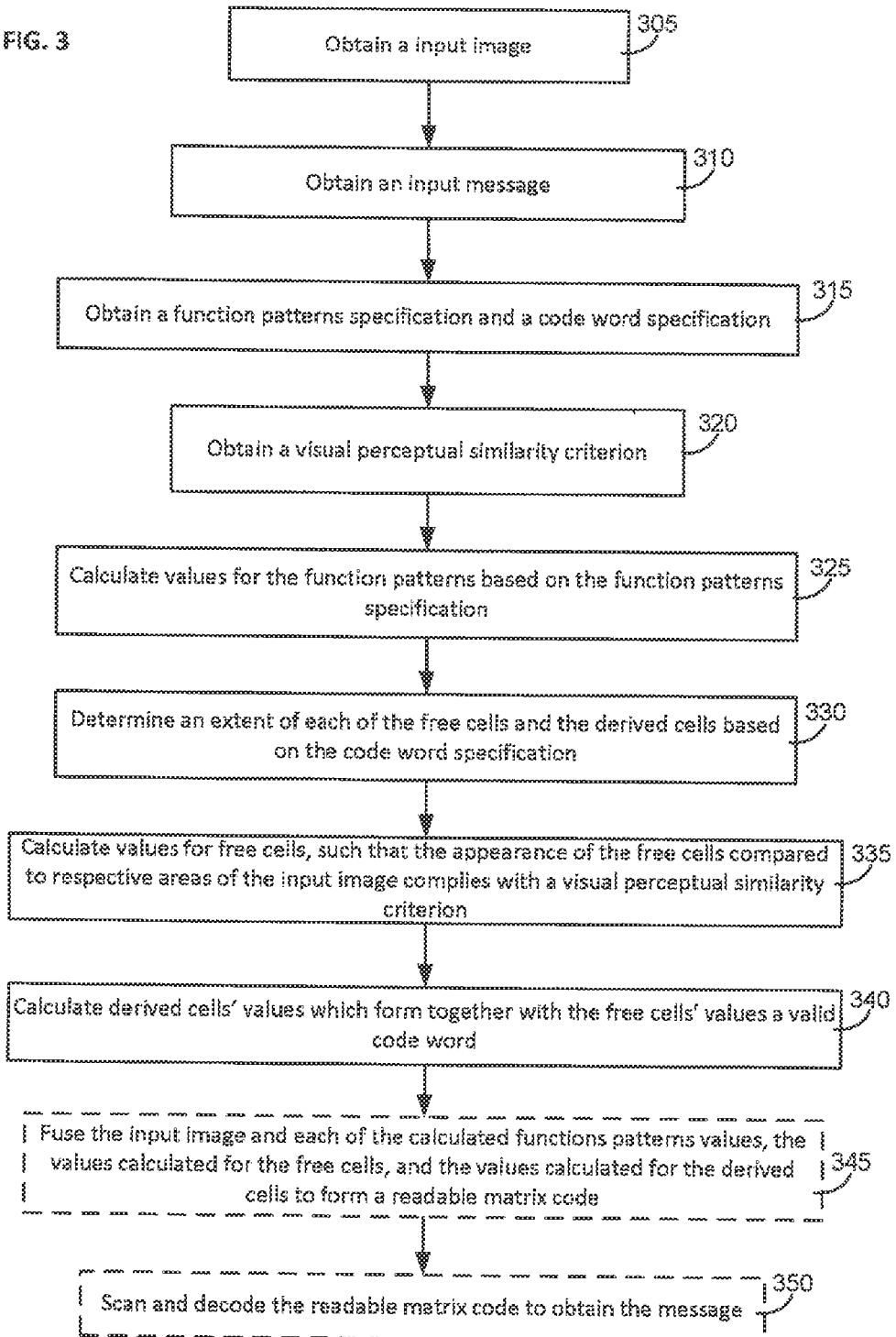
FIG. 3 is a flowchart illustration of a method of generating a readable matrix code representation, according to examples of the presently disclosed subject matter.

Reference is now made to FIG. 3, which is a flowchart illustration of a method of generating a readable matrix code representation, according to examples of the presently disclosed subject matter. According to examples of the presently disclosed subject matter, the method of generating a readable matrix code representation shown in FIG. 3, and described herein with reference thereto, can be implemented on the device shown in FIG. 1 and described above with reference to FIG. 1, or on a general purpose computer, such as is shown in FIG. 2 and described above with reference to FIG. 2. However, it would be appreciated that the method of generating a readable matrix code representation that is shown in FIG. 3, and described below with reference to FIG. 3 can be implemented on any other suitable hardware, and/or possibly on suitable hardware in combination with software which provide a special purpose computer that is configured to perform the operations set forth in FIG. 3 and described below.

According to the examples of the presently disclosed subject matter illustrated in FIG. 3, an input image and an input message that is associated with the Input image can be obtained (blocks 305 and 310, respectively). According to examples of the presently disclosed subject matter, the input image 205 can be obtained via the communication interface 210 from a remote computer through the Internet. Further by way of example, the input message can be entered by a user of the device 200 through the input unit 220. It would be appreciated that the source of the input image and the input message can be local or remote and can be obtained in different ways and using different technologies. Thus, for example, the input image can be received from a first remote computer and the message can be received from a second remote computer that is different from the first remote computer. In a further example, the input image and the message are received from the same source. In still a further example, one or both of the input image and the message are stored locally in the device where the process of generating a readable matrix code representation is implemented.

Continuing with the description of FIG. 3, in addition to the input image and the input message, a readable matrix code specification can be obtained (block 315). By way of example, the readable matrix code specification can be stored in the device and can be loaded to the memory unit 230, when necessary. Still further by way of example, the readable matrix code specification can be in the form of computer software instructions (or a computer software program) that is based on the readable matrix code specification. Non-limiting examples of readable matrix code specifications can include, for example, the following: QR-Code, EZ-Code, DataMatrix.

It would be appreciated that the process of generating a readable matrix code representation, according to examples of the presently disclosed subject matter, can include further inputs, such as tolerances and other characteristics and/or parameters which are associated with a decoder or decoders of the matrix code. For example, certain characteristics of the hardware and/or the software that is involved in the imaging, scanning and/or decoding of the matrix code can also be provided as input to the process of generating a matrix code.

According to examples of the presently disclosed subject matter, a further input which can be obtained as part of the process of generating a matrix code can be a similarity criterion (block 320). The similarity criterion can be, for example, a certain threshold value that is computed using a predefined similarity measure. Further by way of example, the similarity measure can be a perceptual similarity measure, and further by way of example, it can be a perceptual visual similarity measure. Examples of similarity measures which can be used according to examples of the presently disclosed subject matter, include, but are not limited to the following: L-norm distance between the color values of the corresponding pixels within the two images; PSNR over MSE measure between the intensity levels of the corresponding pixels; L-norm distance measured between edge descriptors of fitting salient areas; Structural similarity index measure (SSIM) between intensity values of the corresponding pixels within the two images.

It would be appreciated that according to examples of the presently disclosed subject matter, some of the input that was described above can be pre-programmed into the matrix code generation process, or can be pre-stored in the device which implements the process, and it may not be necessary to obtain all the input mentioned above for each iteration of the process. In this regard, at least, the operations described in blocks 315 and 320 can relate to the loading of pre-programmed or pre-stored data into memory 220.

According to examples of the presently disclosed subject matter, the processing of the input image and input message can commence with the calculation of the values for the function patterns of the readable matrix code. According to examples of the presently disclosed subject matter, the values for the function patterns can be calculated at least according to the function patterns specification (block 325) in the readable matrix code specification. As mentioned above, the readable matrix code specification can include a specification for function patterns, which are used to enable certain operations that are related to the imaging, scanning and/or decoding of the code word. For example, the function patterns can include various patterns or combinations of patterns that can enable a matrix code reader to identify that a certain image contains a readable matrix code, locate the readable matrix code in the image, and configure a scanning and/or encoding process according to parameters indicated by the function patterns.

The values that are calculated for the function patterns can be used to include in the output image respective areas which are readable to comply with the function patterns specification, as part of providing an output image which includes a readable matrix code. As mentioned above, the readable matrix code specification can allow some freedom with respect to the appearance of the function patterns. In such cases, the calculation of the values for the function patterns can implement a similarity measure that can be used to search for values for the function patterns (or for at least some of the cells constitute the function patterns) which meet the requirements of the readable matrix code specification, while achieving a certain level (e.g., the highest possible) of visual perceptual similarity to respective areas of the input image. In further examples of the presently disclosed subject matter, the visual perceptual similarity can be evaluated at a single cells level, with respect to groups of cells, where each group consists of a plurality of cells and/or over the entire image.

Further by way of example, the process of generating a readable matrix code representation can be configured according to certain characteristics, configurations and/or capabilities of the imager, scanner and/or decoder (or a device which combines these functions) that are used in the process of capturing an image of the readable matrix code, scanning the readable matrix code and/or preparing it for decoding. The process can be configured according to a specific device or module, e.g., the ones that are expected to be used in the processing of the readable matrix code, or the process of generating a readable matrix code representation can be configured according to the properties of a number of devices or modules, which are supported by the process. In yet further embodiments, the process of generating a readable matrix code representation can be configured according to general properties of typical devices or modules.

Thus, for example, the readable matrix code specification that is implemented in the process of generating a readable matrix code representation according to examples of the presently disclosed subject matter can be adapted and/or modified according to the characteristics, configurations and/or capabilities of the decoders, scanners or imagers which are supported by the process. In such cases, a range of compatible values or parameters can be provided for functions patterns, which are based on values suggested or required by the readable matrix code specification for the function patterns. For example, the values suggested by the readable matrix specification for function patterns can represent the measures and the structure of the function patterns.

Thus, according to examples of the presently disclosed subject matter, the values for the function patterns can be calculated according to the requirements of the readable matrix code specification, possibly also according to tolerances included in the readable matrix code, and in further examples possibly also according to tolerances, characteristics, configurations and/or capabilities of the decoders, scanners or imagers, such that the values that are calculated for the function patterns provide a certain level (e.g., the highest possible) of visual perceptual similarity to respective areas of the input image, while meeting, de-facto, following imaging, scanning, processing, the requirements of the readable matrix code specification. Examples of visual perceptual similarity measures, and of a process of evaluating visual perceptual similarity are described below and can be implemented here for evaluating visual perceptual similarity between areas in the output image which correspond to function patterns and corresponding areas in the input image.

Continuing with the description of FIG. 3, according to examples of the presently disclosed subject matter, at block 330 the code word processing module 30 may be utilized to determine, based on the code word specification, an extent of each of the free cells and the derived cells in the readable matrix code that is to be generated. In some examples of the presently disclosed subject matter, the extent of each of the free cells and the derived cells can be selected by a user. It would be appreciated that in some cases, it is sufficient to determine or select the extent of just one of the cell types (free or derived), and the extent of the other one is directly derivable. It would be also appreciated that according to examples of the presently disclosed subject matter, block 330 is optional and the process of generating a readable matrix code representation can be preconfigured with a predefined setting for the extent of one or both of the free cells and the derived cells that is to be included in the readable matrix code. It would be also appreciated that a visual perceptual measure and method process that is based on a visual perceptual measure and a criterion which corresponds with the visual perceptual measure can be implemented for determining an extent of each of the free cells and the derived cells in the readable matrix code that is to be generated.

Next, values for the free cells can be calculated. According to examples of the presently disclosed subject matter, the values for the free cells can be calculated such that the appearance of the free cells compared to respective areas of the input image complies with a visual perceptual similarity criterion (block 335). As mentioned above, according to examples of the presently disclosed subject matter, the calculation of the values for the free cells takes into account, in addition to the visual perceptual similarity measure, the general cell specification from the readable matrix code specification. According to further examples of the presently disclosed subject matter, the general cell specification can be common to any cell or pattern (which is a group of cells) and is thus applied for any cell in the readable matrix code.

According to examples of the presently disclosed subject matter, the message which is to be encoded in the readable matrix code can be a specific message and the values for the free cells are calculated further based on the message, such that the message can be read from the readable matrix code, e.g., by decoding the readable matrix code. Still further by way of example, the message can be an input from a user or can be received from any other source.

The message may be required to meet a set of basic rules, which, for example, can define the sort of data that can be included in the message, the maximum length of the message etc.

In some examples of the presently disclosed subject matter, the values for the free cells are calculated based on the readable matrix code specification and further based on the input message that is to be encoded in the readable matrix code.

In other examples of the presently disclosed subject matter, the message that is encoded in the readable matrix code is not taken into account in the calculation of the values of the matrix code, including in the calculation of the values for the free cells, and whichever message that results from the process of generating a readable matrix can be used. It would be appreciated that in such cases the message can reflect the values which provide the best or near best visual perceptual similarity to the input image.

In still further examples of the presently disclosed subject matter, part of the readable code matrix can be used to encode a certain message, and part of the readable code matrix is not bound by any specific message. In this case, there is more freedom in some areas of the readable code matrix, which are not bound to provide certain data in the decoded bit stream, relative to other areas in which the values of the readable matrix code are required to represent specific data.

As was also mentioned above, the readable matrix code specification can include some tolerances. By way of example, the tolerances in the case of free cells can be tolerances that are applicable to the general cell specification. According to examples of the presently disclosed subject matter, the applicable tolerances can be implemented as part of the computation of the values for the free cells. Thus, according to examples of the presently disclosed subject matter, the computation of the values for the free cells can include computing a value for each cell or for each group of cells (consisting of 1, 2, . . . , n cells) according to a visual perceptual similarity measure and according to the free cells specification (e.g., the general cell specification), including, if applicable, any tolerances which are supported by the readable matrix code specification, and possibly also according to an input message.

According to yet further examples of the presently disclosed subject matter, and as was mentioned above, the readable matrix code specification that is implemented in the process of generating a readable matrix code representation, can be configured according to certain characteristics, configurations and/or capabilities of the decoders, scanners or imagers (and devices which combine these functions) that are used in the process of capturing an image of the readable matrix code, scanning the readable matrix code and/or preparing it for decoding. Thus, for example, the general cells specification which is used in the calculation of the free cells can be adapted and/or modified according to the characteristics configurations and/or capabilities of the decoders, scanners or imagers.

Thus, according to examples of the presently disclosed subject matter, the values for the free cells can be calculated according to the suggestions/requirements of the readable matrix code specification, and such that the appearance of the free cells compared to respective areas of the input image complies with a visual perceptual similarity criterion. The values for the free cells can be calculated further according to the tolerance parameters which are set forth by the readable matrix code specification and/or according to parameters that relate to characteristics, configurations and/or capabilities of the decoders, scanners or imagers, and/or according to an input message that is to be encoded in the readable matrix code (if applicable). Thus, in some examples of the presently disclosed subject matter, the values for the free cells can be calculated such that the areas in the output image which represent the free cells provide a certain level (e.g., the highest possible) of visual perceptual similarity to respective areas of the input image, while meeting, de-facto, at the decoder, the requirements of the readable matrix code specification.

According to examples of the presently disclosed subject matter, the calculations which are implemented as part of the process of generating a readable matrix, and which involve implementing a visual perceptual similarity measure, can include an optimization algorithm. Further by way of example, for a given cell or group of cells, the optimization algorithm can be used to find a value which meets the requirement to provide a readable matrix code and which provides a good (e.g., the best) visual perceptual similarity between the respective area of the output image that is rendered according to the selected value and the corresponding area from the input image.

According to examples of the presently disclosed subject matter, the message which the readable matrix code has encoded therein can be selected such that the best visual perceptual similarity is achieved between the input image and the output image representing the readable matrix code.

In further examples of the presently disclosed subject matter, the readable matrix code is required to include a specific message, and the encoding or the readable matrix code can be configured to take into account the message that needs to be encoded.

In some example, the message uses the entire extent of free cells in the readable matrix code, and thus all the computations of the free cells take into account the message that needs to be encoded in the readable matrix code.

In further examples, the message can be encoded using only some of the free cells, and the calculation of the values for the remaining free cells is not bound by a specific message. In such cases, there is freedom with regard to the message to be encoded in the readable matrix code. For instance, when the message that needs to be encoded in the readable matrix code is some prefix (e.g., a URL) and a substantially unique key, the prefix is the specific message that needs to be encoded in the readable matrix code, for example, at a specific region of the code, and the substantially unique key can be selected based on visual perceptual similarity to the respective areas of the input image. It would be appreciated that in such cases the calculation can seek to provide the best (or near best) visual perceptual similarity in the areas where the encoded message is not dictated, and there is a substantial or relatively great freedom to select cell values. In still further examples of the presently disclosed subject matter, the key is encoded in the selected cells together with the prefix.

In some examples of the presently disclosed subject matter, the calculation of the values for the free cells can include a feature which can be used to slightly modify the key which results from the calculation, when there is already an existing readable matrix code which uses the same key. It would be appreciated that slight modification can be made without having a substantially adverse effect on the visual perceptual similarity.

Thus, according to examples of the presently disclosed subject matter, the visual perceptual similarity measure can be used at different stages of the calculation of a value for a given free cell (and possibly in the calculation of values for other cells). According to examples of the presently disclosed subject matter, the visual perceptual similarity measure calculation can be used for computing the pixel values for the input image, for example, using an optimization function or a constrained optimization function that is based on a MSE between the pixel color values in the output message which represent the readable matrix code and the corresponding pixel color values in the input image, and the constraint can limit the search to a certain, e.g., predefined, color range. This calculation can be implemented as a superimposition of a given matrix code on the image. It would be appreciated that this computation may be carried out for both the specific input messages readable matrix code type, the "free" message readable matrix code type, and a combination matrix code that combines an input message and a "free" message, which were all described above.

According to examples of the presently disclosed subject matter, in case the process of generating a readable matrix code is not bound or is partially not bound by an input message, or in other words, if there is freedom with regard to the encoded message to be encoded in the readable matrix code the visual perceptual similarity measure can be used, for example, to determine the decode input value of the cells which are not bound by an input message. In further examples of the presently disclosed subject matter, in case the process of generating a readable matrix code is not bound or is partially not bound by an input message, the visual perceptual similarity measure can be used, for example, to determine the color values of pixels in the output image which correspond to a cell in a readable matrix code. It would be appreciated, that the term encoded message as used herein relates to the entire data that is encoded in the data cells, which can include, for example, the input message, and possibly also padding characters.

There is now provided an example of the use of a visual perceptual similarity measure for determining a decode input value of a cell, according to examples of the presently disclosed subject matter. According to examples of the presently disclosed subject matter, a visual perceptual similarity measure can be used to determine the decode input value of a certain free cell as follows: quantifying pixels color values over an area of the input image with which the free cell is associated; estimating a visual similarity between the pixels color values and each of a dark color value and a light color value; and determining the decode input value based on the score of the visual similarity estimation. For example, select the decode input value such that the corresponding cell will be decoded as the color value (dark or light) with the smaller MSE, according to the readable matrix code specification.

There is now provided an example of the use of a visual perceptual similarity measure for determining color values of pixels in the output image which correspond to a cell of a readable matrix code, according to examples of the presently disclosed subject matter. According to examples of the presently disclosed subject matter, the color values of the pixels in the output image which correspond to a cell of a readable matrix code can be determined using a visual perceptual similarity measure, an optimization function, and a decode input value of the cell. These attributes can be considered as an optimization algorithm that can, for example, be used to calculate the color values of the pixels in the output image which correspond to a cell of a readable matrix code such that the pixels in the output image will have high visual similarity to the corresponding area of the input image, and its decode input value will be, with high probability, valid when read by a scanning device.

An example of an optimization algorithm which can be implemented as part of a process of generating a readable matrix code representation according to examples of the presently disclosed subject matter is now described. In the example below two values or two sets of values (or one value and one set of values) can be computed for a given cell of the readable matrix code, simultaneously or one by one. The first value can represent the decode input value of the cell of the readable matrix code (for example dark or light). The second set of values can include color values of pixels in the output image which correspond to the cell of the readable matrix code. The representation of the matrix code in the output image, according to the colors computed for each cell or area in the matrix code can provide part of the readable matrix code (when scanned and processed by a suitable scanning device).

Formula 1 provides a mathematical representation of an example of a computation that can be implemented as part of the process of generating a readable matrix code representation, according to examples of the presently disclosed subject matter:

$$(\text{Pixels'Colors}) = \text{argmin}_{Colors}(\text{alpha} \cdot \text{MSE}(\text{Colors Input Colors}) - \text{beta} \cdot \text{Range}(\text{decode input value},\text{Colors}) \quad \text{Formula (1)}$$

where "Input Colors" denote the color values of pixels of the input image which correspond to the cell of the readable matrix code for which the computation is performed, "decode input value" r is the decode input value of the cell, and "Pixels' Colors" are the color values of the pixels of the output image; $\text{argmin}_p(F)$—is a known optimization mark for an optimization function that searches for an argument that yields the minimum value for the target function F, while altering the parameter p; alpha and beta are optional weighting factors that can be used to increase or decrease the weight of the parameters involved in the calculation to control, for example, the level similarity or reliability which the calculated value provides; decode input value is the value that is selected or calculated for the cell of the readable matrix code according to the readable matrix specification. The decode input value can be specified, or it can be calculated using formula (1). For example, the optimization problem of formula (1) can be solved twice, once for each possible decode input value (and if more than two decode input values are used, the optimization problem is solved for each value). The decode input value which produced a lower target value (or higher, depending on the implementation of the optimization problem) can be selected as the decode input value for the cell, for example, to allow a relatively high visual similarity between the corresponding areas of the output image and the input image; Range( ) denotes a function which determines whether the pixels values are within an allowed range of values. For example, the Range( ) function can be configured to return a grade of '0' if a color is in the range, or '1' if the color is outside the range. The beta factor can be used to multiple the Range result by some weighting factor. However in further examples of the presently disclosed subject matter, a smooth function between 0-1 or even between a X-Y can be used for the range.

According to examples of the presently disclosed subject matter, in Formula 1 the mean square error (also referred to herein in abbreviation "MSE") algorithm is used to evaluate the visual perceptual similarity among the area in the input image and the respective area in the output image which corresponds to a readable matrix cell. It would be appreciated that many other visual perceptual similarity algorithms can be used in the search for the value that is to be given to the various readable matrix cells. For example, another option is to use the peak signal to noise ratio (also referred to herein by the abbreviation "PSNR") algorithm.

In still further examples of the presently disclosed subject matter, the process can be implemented with any one of a plurality of visual perceptual similarity algorithms and the algorithms that are used for a given readable matrix code can be selected on an ad-hoc basis, or the selection can be according to the type or any other feature or characteristic of the input image, of the output image, and/or of the desired readable matrix code. Still further by way of example, the selection can be a manual selection, by a user input.

In yet further examples of the presently disclosed subject matter, the visual perceptual similarity algorithm that is used in the calculation of the values for the readable matrix cells can be adapted and or can be combined with other algorithms, including algorithms that are not in-and-of-themselves visual perceptual similarity algorithms.

In yet a further example, the calculation of the value for a given cell can be configured such that the value is calculated further in accordance with the values or characteristics of other cells, such as neighboring cells. For example, the calculation of the value for a given cells can include measures of the average illuminant value of the pixels in the cell and in neighboring cells, and this measure can be taken into account when calculating the value for the cells. A calculation that is based on this example can be combined with the MSE calculation mentioned above.

In yet a further example, the calculation of the value for a given cell can include a quantification algorithm that can be used to quantize the colors in the image into two colors, e.g., dark or light, even in cases where the image is all dark or all light.

Continuing now with the description of FIG. 3, following the calculation of the value for the free cells, the values which form the derived cells can be calculated (block 340). As mentioned above, according to the readable matrix code, a code word includes free cells and derived cells. According to examples of the presently disclosed subject matter, the derived cells can be cells whose values are based on the values of corresponding free cells.

By way of example, the free cells are data cells and the derived cells can be error corrections cells. However, as mentioned above, depending on the type of error correction mechanism that is used in the readable matrix code (according to the corresponding readable matrix code specification), the free cells can include error correction cells and the derived cells can include data cells. In such cases, data cells are replaced by error correction cells in the free cells and the data cells become derived cells. This means that in such cases, the values for (some or all) the error correction cells can be computed such that the appearance of the error correction cells, compared to respective areas of the input image, complies with a visual perceptual similarity criterion, and the values of the corresponding data cells are computed based on the values that were calculated for the error correction cells.

Referring back to FIG. 1, in case the free cells are data cells and the derived cells are error correction cells, free cells processing module 130 can be configured to process the data cells, and derived cells processing module 140 can be configured to process the error correction cells. The free cells processing module 130 can be configured to use the visual perceptual similarity evaluation module 132 to calculate values for the free cells, such that the appearance of the free cells compared to respective areas of the input image complies with a visual perceptual similarity criterion. The derived cells processing module 140 can be configured to use the error correction calculator module 142 to calculate values for the derived cells according to the code word specification and based on the values of the free cells. It would be appreciated that the free cells processing module 130 can be fed with data cells or with error correction cells and in case at least some of the free cells are error correction cells, the values for the error correction cells can be computed according to the code word specification and such that the appearance of such error correction cells compared with respective areas of the input image meets a visual perceptual similarity criterion. The corresponding data cells can be fed to the derived cells processing module 140, and the error correction calculator module 142 can be used to calculate values for the derived data cells according to the code word specification and based on the values of the corresponding error correction free cells.

After the values for the function areas, the values for the free cells and the values for the derived cells are calculated, the input image and each of the calculated function patterns values, the values calculated for the free cells, and the values calculated for the derived cells can optionally be fused with the input image to form a readable matrix code (block 345). Fusing the values for the cells and patterns with the input image as used herein relates to a process which, according to examples of the presently disclosed subject matter, receives as input the values for the function areas, the values for the free cells and the values for the derived cells, and the corresponding parts of the input image and modifies the pixel values of the corresponding areas of the input image, such that the average illuminant/lightness that are used by the decoder, after the regions of the fused image are captured by the reader, are converted to pixel values following processing by an image processing module and the pixels values are processed by the decoder (if such processing takes place), which enables the decoder to decode the relevant part(s) of the image as a readable matrix code.

In another example, the decode input value and the color values of the pixels of the output image, which correspond to a cell of the readable matrix code, particularly in respect of a free cell, can be computed using a single computation. For example, as previously described, using Formula (1), the decode input value for a free cell can be computed together with pixel color values.

According to examples of the presently disclosed subject matter, a region in the fused image, which represents a readable matrix code cell, can be a pixel, or a group of pixels. A pattern (e.g., a function pattern) in the fused image is represented by a group of pixels.

According to examples of the presently disclosed subject matter, the fusing operation or process can involve implementing a visual perceptual similarity measure to calculate a value for one or more of: the function patterns, the free cells, the derived cells, and other types of cells that are used in the process of generating a readable matrix code representation according to examples of the presently disclosed subject matter (e.g., selected cells which will be discussed below). According to examples of the presently disclosed subject matter, the visual perceptual similarity calculations that are implemented as part of the calculations of the function patterns, the free cells, the derived cells, and any other types of cells that are used in the process of generating a readable matrix code representation, can be performed at the cell or pattern level, which means that if the cell or pattern is associated with a group of pixels (and not just a single pixel), the value that is calculated for a given cell can be applied to each pixel that is associated with the cell. Further by way of example, the calculations that are carried out as part of the fusing operation can be at the sub-cell level. For example, if each cell of the readable matrix code is associated with a group of pixels (e.g.: with 2, 3, . . . , n pixels) in the output or fused image, the computation can be at the cell level, or at the sub-cell level, for example, at the pixel level.

Furthermore, the calculation of the values for the free cells at block 335, which involves applying a visual perceptual similarity measure, to determine, based on visual perceptual similarity to the input image and based on the readable matrix specification (or more specifically the code-word specification from the readable matrix specification) can involve a basic similarity measure, such as SSIM or PSNR, or the computation can be more complex and involve additional measures, including some or all of the measures which are described here as being implemented as part of the fusing operation, and which are applicable to computations at the cell level (and are not sub-cell level computations). Similarly, visual perceptual similarity measures which are implemented in the cell level, including for example one or more of the visual perceptual similarity measures described herein with reference to the fusing operation, can be carried out as part of the computations of the values for the function patterns, of the values for the derived cells, and/or as part of the computation of values for other types of cells that are used in the process of generating a readable matrix code representation according to examples of the presently disclosed subject matter (e.g., selected cells which will be discussed below). Thus, it would be appreciated that some of the visual perceptual similarity measures described herein can be implemented at different stages and as part of different operations which are carried out as part of the process of generating a readable matrix code representation, and the decision when to use a certain computation can be based, for example, on design preferences.

Returning now to the description of the fusing operation (block 345), there are provided below, in accordance with some examples of the presently disclosed subject matter, a description of some computations which can be implemented as part of the fusing operation. It will be appreciated that the fusing operation can include one or more of the below described computations.

As part of the fusing operation, the input image can be copied to memory (e.g., to memory unit 230). For convenience, the image which resides in the memory and that is processed as part of the fusing operation shall be referred to herein as the "temporary image". It would be appreciated, that all the images referenced in the description of examples of the presently disclosed subject matter, can be in the form of digital data that is stored on a tangible computer readable medium.

According to examples of the presently disclosed subject matter, further as part of the fusing operation, luminance fusing thresholds can be defined or calculated. Still further by way of example, two luminance fusing thresholds can be defined, a dark-threshold and a light-threshold. Yet further by way of example, and for illustration purposes, in a luminance scale of [0,255] a dark-threshold upper bound can be a value in the order of 80 and a light-threshold lower bound can be in the order of 170. Still further by way of example, the luminance values can be provided as Lab channels. A Lab color space is a color-component space with dimension L for lightness and a and b for the color-component dimensions, based on nonlinearly compressed CIE XYZ color space coordinates.

According to further examples of the presently disclosed subject matter, a global threshold can be determined by taking a reflectance/intensity/luminance value midway between the maximum reflectance/intensity/luminance and minimum reflectance/intensity/luminance of a certain image (e.g., the temporary image) or part of it. The global threshold for the temporary image can be calculated, and the computation of the luminance fusing thresholds can be calculated subsequently, based on the calculated global threshold. For example, the luminance fusing thresholds can be calculated such that that there will be a gap between the global threshold and the luminance fusing thresholds. The purpose of the gap is to enable a decoder to decode the cells with high probability as valid matrix code cells and with the correct value, according to a readable matrix code specification and/or implementation (possibly after optical reading and signal processing and any further processing that may take place before decoding).

According to examples of the presently disclosed subject matter, following the computation of the luminance fusing thresholds, for each pixel in the temporary image, the luminance value of the pixel can be shifted according to a selected one from the luminance fusing thresholds. For example, if a luminance value for a given pixel is below the global threshold, the dark-threshold can be applied to the pixel value, and the luminance value for the pixel can be shifted accordingly. Shifting relates to any allowed operation on a pixel, such as add or subtract a value to or from the pixel's value.

According to further examples of the presently disclosed subject matter, the global threshold for the temporary image is initially a provisional global image. The provisional global image can be re-evaluated after each of one or more pixel shifting operations, and based on the results of the re-evaluation, the global threshold can be updated. For example, the re-evaluation of the provisional global threshold can include re-sampling the maximum reflectance and minimum reflectance of the temporary image. Further by way of example, the computation of the updated provisional global threshold can include re-computing the midway value between the maximum reflectance and minimum reflectance.

According to examples of the presently disclosed subject matter, following completing of the pixel shifting operation (in one or more iterations), the computed luminance values for all the pixels can be used to convert the temporary image to a desired color representation, and copying the temporary image into the output image.

In a further example of the presently disclosed subject matter, following the copying of the input image to the memory, and the computation of the luminance fusing thresholds, for example, as was described above, the fusing operation can further include, segmenting the temporary image into spatial cells based on the readable matrix code specification, and for each region which corresponds to a cell (based on the readable matrix specification) in the temporary image, the average luminance value of the cell can be shifted according to the luminance fusing threshold that is appropriate according to the average luminance value of the cell. Thus, for example, if the average luminance value of a given cell is below the global threshold (e.g., this is a "dark" cell), the average value of the cell is shifted according to the dark luminance fusing threshold.

According to examples of the presently disclosed subject matter, shifting the average luminance value of the cell can include, for example, shifting a sub-group of pixels of the entire group of pixels that belong to the cell. Hence, for example, if the value that was computed for the cell as part of the process of generating a readable matrix code indicates that the cells are dark (e.g., below the global threshold), this necessitates shifting some of the pixels that are associated with the cell, and maintaining others at the computed value (or at least shifting to a different extent or even making them "lighter") according to the process of generating a readable matrix code representation, such that the average for the cell drops below the threshold.

According to further examples of the presently disclosed subject matter, the shifting operation can be based on a shifting value, which corresponds to a difference between the average value and the appropriate global threshold of the corresponding matrix code cell. Further by way of example, the shifting operation can include shifting all the pixels that are associated with a given cell by the calculated difference value, while clipping values of the pixels under (for dark cells) the minimum presentable value. For example in the [0,255] range, which is a common range for many color channels, any shift that would result in a value that is under 0

(a negative values) can be clipped to 0. The clipping operation can interfere with the process of averaging a value of a cell to below (or above) a certain threshold, and therefore according to examples of the presently disclosed subject matter, clipping should be considered when determining the difference value. In a further example, the effect of clipping can be evaluated after the shifting process, and a second shifting process can be implemented to overcome the clipping effect.

According to yet further examples of the presently disclosed subject matter, considering the QR Code specification as an example, the shifting values can be computed using an optimization function that takes into account: (a) a visual similarity measure between the corresponding cell/pixels within the input and the temporary images; and (b) a readability measure for a given cell and a given light or dark threshold. Further by way of example, the altering arguments of the optimization function can be the luminance or color values of the pixels of the cell. Such an optimization function can be similar to the function presented in Formula (1), where the readability function is the mentioned Range function. In general, a readability function is a function that (a) gives high grades to color values which enables a decoder to decode the cells with low probability as valid and with the correct value, according to a readable matrix code specification and/or implementation (possibly after optical reading and signal processing and any further processing that may take place before decoding) and (2) gives low grades to colors which enables a decoder to decode the cells with high probability as valid and with the correct value, according to a readable matrix code specification and/or implementation (possibly after optical reading and signal processing and any further processing that may take place before decoding). Thus, the suggested function encourages the mentioned optimization function to choose colors with high probability to be scanned and decoded correctly, while the optimization function also considers the visual similarity measures.

For example, a visual similarity measure can be a L2 norm between the temporary luminance value and the input luminance value. The readability measure can be a sigmoid function penalizing temporary color values far and away from regions that contain colors values that enable a decoder to decode the cells with low probability as valid and with the correct value, according to a readable matrix code specification and/or implementation, and encouraging temporary color values to be assigned with color values that enables a decoder to decode the cells with high probability as valid and with the correct value, according to a readable matrix code specification and/or implementation.

According to examples of the presently disclosed subject matter, the optimization function can also include a weight parameter. The weight parameter can be used to weight the importance of the two suggested measures, which are (a) a visual similarity measure between the corresponding cell/pixels within the input and the temporary images; and (b) a readability measure for a given cell and a given light or dark threshold, according to a predefined setting, such as the demands of a certain application, or according to a manual selection by an operator.

According to yet further examples of the presently disclosed subject matter, the shifting value can be computed using the optimization function that was mentioned above, and further taking into account in the optimization function the appearance of neighboring cells and the visual effect of neighboring cells on the appearance and the visual similarity of each cell. Further by way of example, the neighboring cells can include any number of cells and are not necessarily limited to the cells that have a common edge with the cell to which the optimization function is being applied, in this regard, by way of example, the optimization function can even take into account the entire image.

Figure 4:
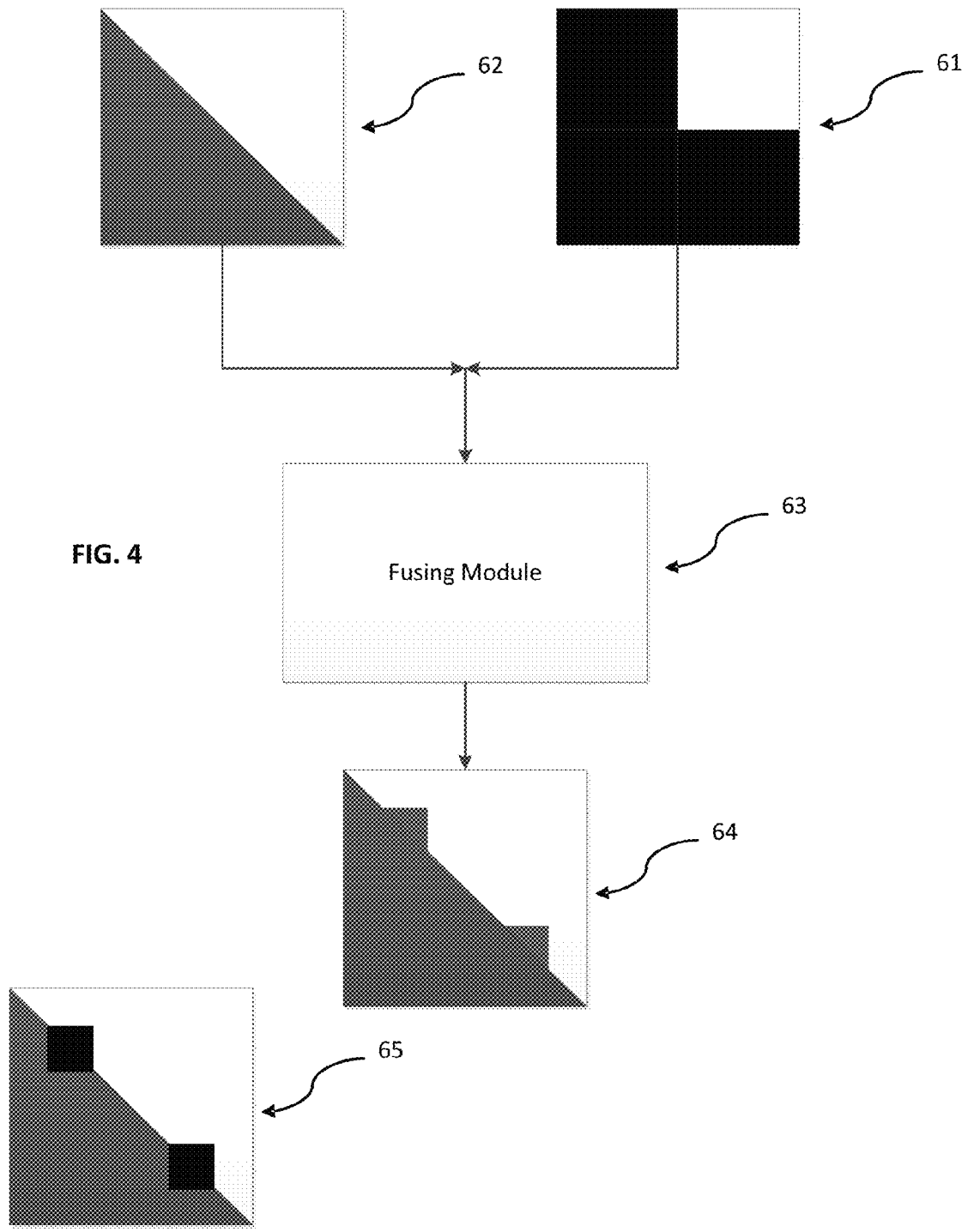
FIG. 4 is a graphical illustration of a fusing operation according to examples of the presently disclosed subject matter.

Reference is now additionally made to FIG. 4, which is a graphical illustration of a fusing operation according to examples of the presently disclosed subject matter. For convenience, the fusing operation shown in FIG. 4 is made with respect to a relatively small region, which represents the input image (this region is referenced 62) and a representation of an area of a readable matrix code that is generated according to the matrix code specification, the input message and using the method of generating a readable matrix code according to examples of the presently disclosed subject matter (this area is referenced 61).

In FIG. 4, the matrix code cells 61 represent a possible 2×2 data cell. However it would be appreciated that the process described herein below with reference to FIG. 4 can be readily expanded to the entire image and readable matrix code. It would be appreciated that the matrix code cells 61 shown in FIG. 4 represent the appearance of the readable matrix code which can be generated based on the readable matrix code specification, without taking into account the input image or any of the other factors (such as the tolerances, characteristics, configurations and/or capabilities of the decoders, scanners or imagers) that were discussed above. Nevertheless, as can be seen in FIG. 4, the matrix denoted by the numeral 61 presents a relatively high visual similarity to the input image 62 as a result of an implementation of the method of generating a readable matrix code according to examples of the presently disclosed subject matter. The fusing process can take advantage of the computed decode input values in the matrix denoted by the numeral 61 towards a more efficient fusing process, in terms of performance and/or in terms of the quality (level of visual perceptual similarity) of the fused image.

According to examples of the presently disclosed subject matter, the fusing operation in FIG. 4 receives as input the matrix code specification cells 61 and the input image 62. The fusing module 63 can be configured to implement an algorithm which creates an image 64 which can be saved in a new location in the memory, or can replace the matrix code cells 61 or the input image 62 in the memory. The image 64 resulting from the fusing operation can be the output image of the process of generating a readable matrix code representation, and in such a case can replace in memory the matrix code cells 61 or the input image 62. However in further examples of the presently disclosed subject matter, the temporary image 64 can be an intermediate image in case the fusing operation includes multiple iterations (two, three, . . . , n iterations), and in such cases it may be necessary to maintain in memory, in addition to the temporary image 64, the matrix code specification cells 61 or the input image 62, to enable further processing of the temporary image and further iterations of the fusing operation.

According to examples of the presently disclosed subject matter, taking advantage of the tolerances included in the readable matrix code, and/or taking advantage of tolerances, characteristics, configurations and/or capabilities of the decoders, scanners or imagers, a cell in the output image 64, which represents a cell of a readable matrix code, can be interpreted with the same value as the respective value of the matrix code specification cells 61, if a certain amount of pixels in the cell are assigned with intensity values that pass a certain threshold, defined by the readable matrix code specification, and implemented by the scanner. For example in the QR Code specification such a threshold is the global threshold, while de facto few scanners implement with high accuracy the suggested criterion, while others define a similar criterion using, as an example, a semi-global global threshold, meaning a global threshold per region.

According to examples of the presently disclosed subject matter, for a readable matrix code cell, the fusing module 63 can be configured to assign a group of pixels in the output image 64 (or in the temporary image) with values that are expected to enable a decoder (possibly after optical reading and signal processing and any further processing that takes place before decoding) to decode the cell as a valid cell of a readable matrix code (regardless of the value of other pixels in the cell). Further by way of example, the group of pixels of the cell whose values enable a decoder to read the cell as a valid cell of a readable matrix code constitute only part of the cell's pixels, and still further by way of example, the rest of the cell's pixels can be assigned with the value of the respective pixels in the input image 62. By way of example, center pixels of each cell can be assigned with values close to the value of the respective in the matrix code region 61. These values can be, for example, the average of the values of neighboring pixels in the input image 62 that are considered to present a higher level of visual similarity to the respective values in the matrix code region 61. This latter computation differs from the computation that was used to generate the cell 65, in which the center pixels of the cell were assigned with the value of the respective cells in the matrix code region 61.

Figure 5:
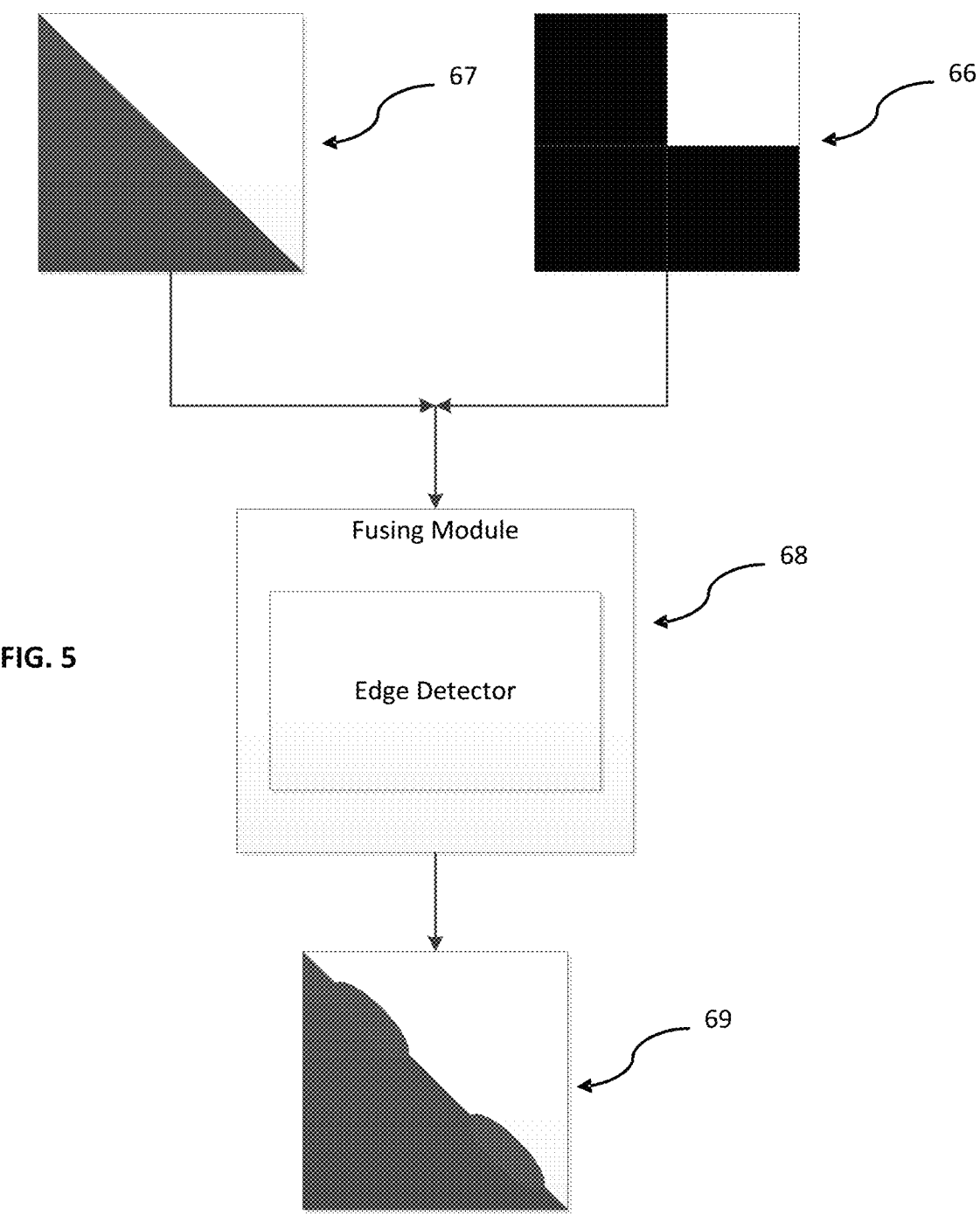
FIG. 5 is a graphical illustration of a fusing operation according to examples of the presently disclosed subject matter.

Reference is now additionally made to FIG. 5, which is a graphical illustration of a fusing operation according to examples of the presently disclosed subject matter. For convenience, the fusing operation shown in FIG. 5 is made with respect to a relatively small region, which represents the input image (this region is referenced 67) and a representation of an area of a readable matrix code that is generated strictly according to the matrix code specification and the input message (this area is referenced 66). In FIG. 5, the matrix code cells 66 each represent a possible 2×2 data cell. However it would be appreciated that the process described hereinbelow with reference to FIG. 5 can be readily expanded to the entire image and readable matrix code. It would be appreciated that the matrix code cells 66 shown in FIG. 5 represent the appearance of the readable matrix code which can be generated based on the readable matrix code specification, without taking into account the input image or any of the other factors (such as the tolerances, characteristics, configurations and/or capabilities of the decoders, scanners or imagers) that were discussed above. Nevertheless, as can be seen in FIG. 5, the matrix denoted by the numeral 65 presents a relatively high visual similarity to the input image 66 as a result of an implementation of the method of generating a readable matrix code according to examples of the presently disclosed subject matter. The fusing process can take advantage of the computed decode input values in the matrix denoted by the numeral 65 towards a more efficient fusing process, in terms of performance and/or in terms of the quality (level of visual perceptual similarity) of the fused image.

According to examples of the presently disclosed subject matter, the fusing operation in FIG. 5 receives as input the matrix code specification cells 66 and the input image 67. The fusing module 68 can be configured to implement an algorithm which creates an image 69 which can be saved in a new location in the memory, or can replace the matrix code specification cells 66 or the input image 67 in the memory. The image 69 resulting from the fusing operation can be the output image of the process of generating a readable matrix code representation, and in such a case can replace in memory the matrix code specification cells 66 or the input image 67. However in further examples of the presently disclosed subject matter, the temporary image 69 can be an intermediate image in case the fusing operation includes multiple iterations (two, three, . . . , n iterations), and in such cases it may be necessary to maintain in memory, in addition to the temporary image 69, the matrix code specification cells 66 or the input image 67, to enable further process of the temporary image and further iterations of the fusing operation.

According to examples of the presently disclosed subject matter, and in accordance with previous explanation, taking into account the tolerances included in the readable matrix code, and/or taking into account the tolerances, characteristics, configurations and/or capabilities of the decoders, scanners or imagers, a value of a cell which is represented by pixels in the output image 69, can be determined using a threshold which is set forth in the matrix code cells 66 (and which is implemented by the reader device), even if part of the pixels are above the threshold and other pixels which are also associated with the cell are below the threshold. As an example of such a threshold, in the QR Code specification a global threshold is specified, and the pixels values can be evaluated using the global threshold. Further by way of example, the value of a cell can be determined according to the value of a majority of the pixels, and not all the pixels which are associated with a readable matrix code cells must have the same relation with the global threshold.

In further examples of the presently disclosed subject matter, taking into account the tolerances, characteristics, configurations and/or capabilities of the decoders, scanners or imagers can include, for example, implementing a semi-global threshold or a regional threshold, such that the global threshold suggested by the readable matrix code specification is adapted per region, for example, according to visual and/or optical characteristics of the region and/or of neighboring regions.

According to examples of the presently disclosed subject matter, a copy enable algorithm which can be implemented according to examples of the presently disclosed subject matter, can be used to determine if a cell value which enables a decoder to decode the cell with high probability as valid and with the correct value, according to a readable matrix code specification and/or implementation (possibly after optical reading and signal processing and any further processing that may take place before decoding) can be the same as the value of the corresponding area in the input image, such that the area from the input image can be copied to the output image without any modification. Thus, when it is determined according to the copy enable algorithm that an area from the input image can be copied to the output image, the respective pixels' values from the input image 62 can be simply copied to the corresponding areas in the output image 64 (or to the temporary image).

Resuming now the description of possible fusing operation implementations, in yet a further example of the presently disclosed subject matter, following the copying of the input image to the memory, and optionally converting the image to Lab image representation, and after segmenting the temporary image into spatial cells based on the readable matrix code specification, for each region which corresponds to a cell (based on the readable matrix specification) or to a certain groups of cells consisting of a certain number of neighboring cells in the temporary image, a semi-global threshold can be computed that takes into account only the cell or group of cells and a certain number of neighboring cells. The luminance fusing thresholds can then be computed, for example the light and dark fusing thresholds that were mentioned above, based on the semi-global threshold that were calculated for the cells or for the cell groups. By way of example, the light and dark fusing thresholds can be calculated to have a safe distance for the semi-global thresholds. In this example, the fusing thresholds are computed for each cell or for each group of cells.

Subsequently, according to examples of the presently disclosed subject matter, the luminance values of the cells can be shifted, for example, according to any one of the shifting operations that were described above which are adapted to use the cell or group of cells fusing thresholds. For the sake of illustration, the results can be provided as Lab channel values. The temporary image can be converted to the desired color representation, and can be copied to provide the output image.

According to a further example, the fusing operation can include copying the input image to memory while converting the input image to HSV image representation. The image in the memory shall be referred to herein as the temporary image.

Further by way of example, two color ranges can be defined: a dark-range and a light-range. Still further by way of example the range can be selected to match requirements of a CMYK representation of the resulting output image. Still further by way of example, the range can be selected according to a criterion that is based on a high probability measure of a likelihood that a printed version of the output image can have a smaller color MSE distance to the digital image. For example in an HSV scale of $[0,100]^3$ the dark-range can be selected as $[S,V]<[25,25]$ upper bound, and a light-range can be selected $[S,V]>[85,85]$. In another example, the current global threshold of the temporary image can be first calculated, and subsequently the light and dark ranges can be computed according to valid dark and light ranges. In yet another example, the $[S,V]$ pairs denote an upper and a lower bound, and the upper and lower bounds define a range, as explained above, which can be computed as a function of H.

According to further examples of the presently disclosed subject matter, the fusing operation can include: for each pixel in the temporary image compute its HSV value by both (1) choosing an HSV value within an HSV color range, which enables a decoder to decode the cell with high probability as valid and with the correct value, according to a readable matrix code specification and/or implementation (possibly after optical reading and signal processing and any further processing that may take place before decoding), and (2) choosing the closest value within the said range which is the closest to the HSV value of the corresponding pixel in the input image. For example, in QR Code, such ranges should represent either dark or light. The measure for defining such distances between colors, in order to compute the said closest value, can be for example, any L norm distance. Thus, for example, if the value of the pixel's corresponding matrix code cell is dark, then the pixel's HSV value can be shifted into the dark-range; and if the value of the pixel's corresponding matrix code cell is light, then the pixel's HSV value can be shifted into the light-range. The resulting values can be used to update the temporary image, the temporary image can optionally be converted to any desired color representation, and the temporary image can be copied to give rise to the output image.

It would be appreciated that this implementation of the fusing operation can also be implemented at the cells level rather than at the pixel level as was already described above with respect to other computations.

According to examples of the presently disclosed subject matter, following completing of the shifting operation (in one or more iterations), the computed luminance values for all the pixels (whether computed on a per-pixel basis or on a per-cell or cells-group basis) can be used to convert the temporary image to a desired color representation, and the temporary image can be copied to give rise to an output image.

Optionally, as part of examples of the presently disclosed subject matter, the resulting output image can be scanned and the readable matrix code that is represented by the output image can be decoded to obtain the message that was encoded into the output image (block 350).

Figure 6:
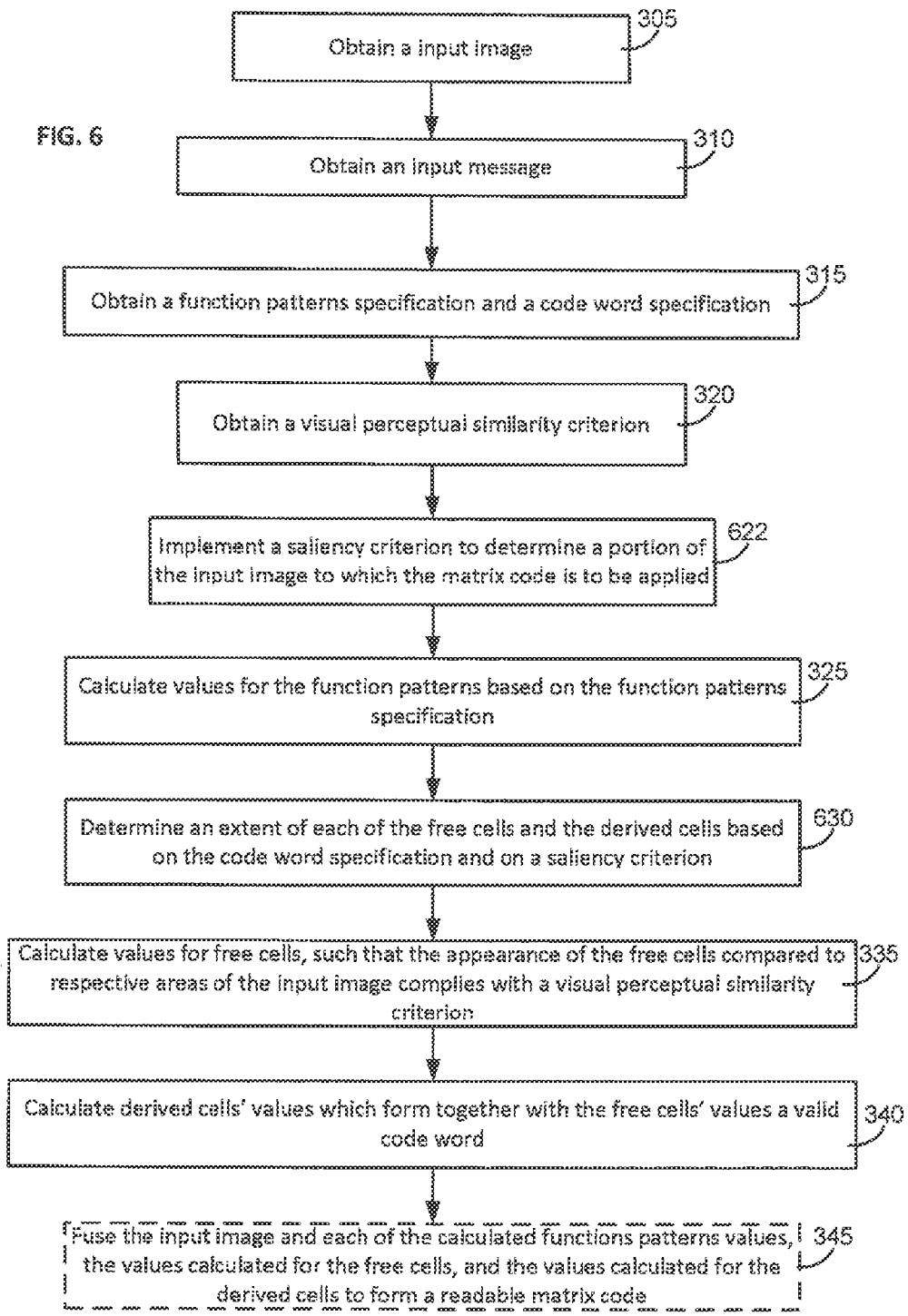
FIG. 6 is a flowchart illustration of a method of generating a readable matrix code representation, according to examples of the presently disclosed subject matter.

Reference is now made to FIG. 6, which is a flowchart illustration of a method of generating a readable matrix code representation, according to examples of the presently disclosed subject matter. In FIG. 6, in addition to the blocks shown in FIG. 3 and which were described in length above with reference to FIG. 3, the fusing process includes implementing a saliency criterion to determine a portion of the input image to which the matrix code is to be applied (block 622). As mentioned already above, in some examples of the presently disclosed subject matter, the readable matrix code representation can be generated for only a portion of the input image. In such cases, by way of example, a saliency criterion can be used to determine which portion of the original image should be taken as the input image that is processed and replaced or fused with a readable matrix code representation that is generated based on the teachings provided herein. It would be appreciated that a saliency criterion is merely one example of a criterion that can be used for determining which portion of the original image should be used as the input image to be processed and replaced or fused with a readable matrix code representation according to examples of the presently disclosed subject matter.

Furthermore, in FIG. 6, in addition to the blocks shown in FIG. 3 and which were described above with reference to FIG. 3, the process of selecting an extent of each of the free cells and the derived cells includes implementing a saliency criterion (block 630). In some examples of the presently disclosed subject matter, the free cells selection process further comprises a saliency criterion and uses the saliency criterion to designate the free cells. For example, the cells or areas which are most salient from all possible cells can be chosen as the free cells.

Figure 7:
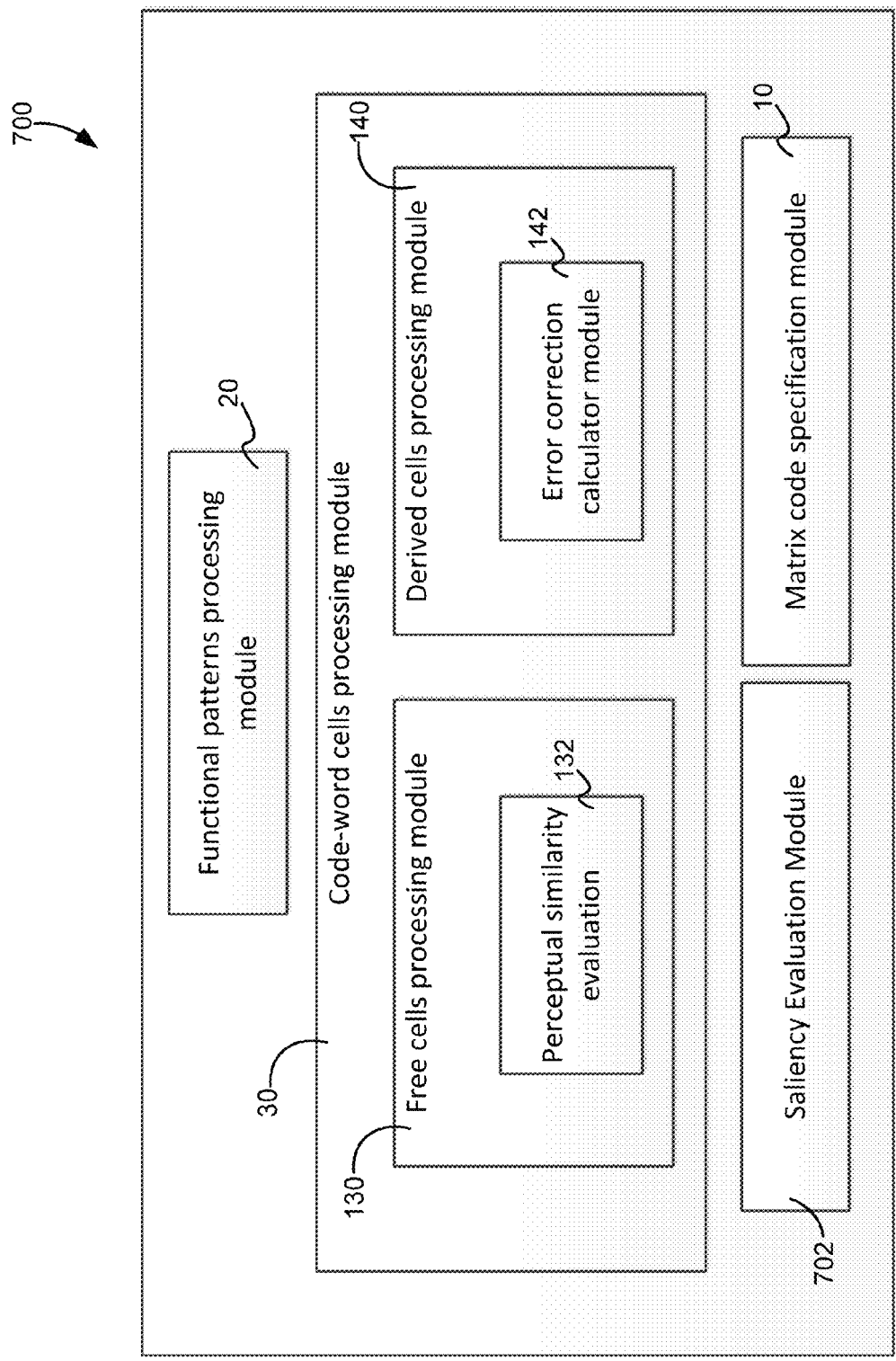
FIG. 7 is a block diagram illustration of a device for generating a readable matrix code representation image, according to examples of the presently disclosed subject matter.

Reference is now made to FIG. 7, which is a block diagram illustration of a device for generating a readable matrix code representation image, according to examples of the presently disclosed subject matter. In FIG. 7, in addition to the blocks shown in FIG. 1 and which were described above with reference to FIG. 1 and with further reference to FIG. 3, the device 700 can include a saliency evaluation module 702. By way of example, the saliency module 702 can be configured to implement a saliency criterion and saliency detection method to select a portion of the input image that is to be processed by the device 702, for generating a corresponding readable matrix code.

Figure 8:
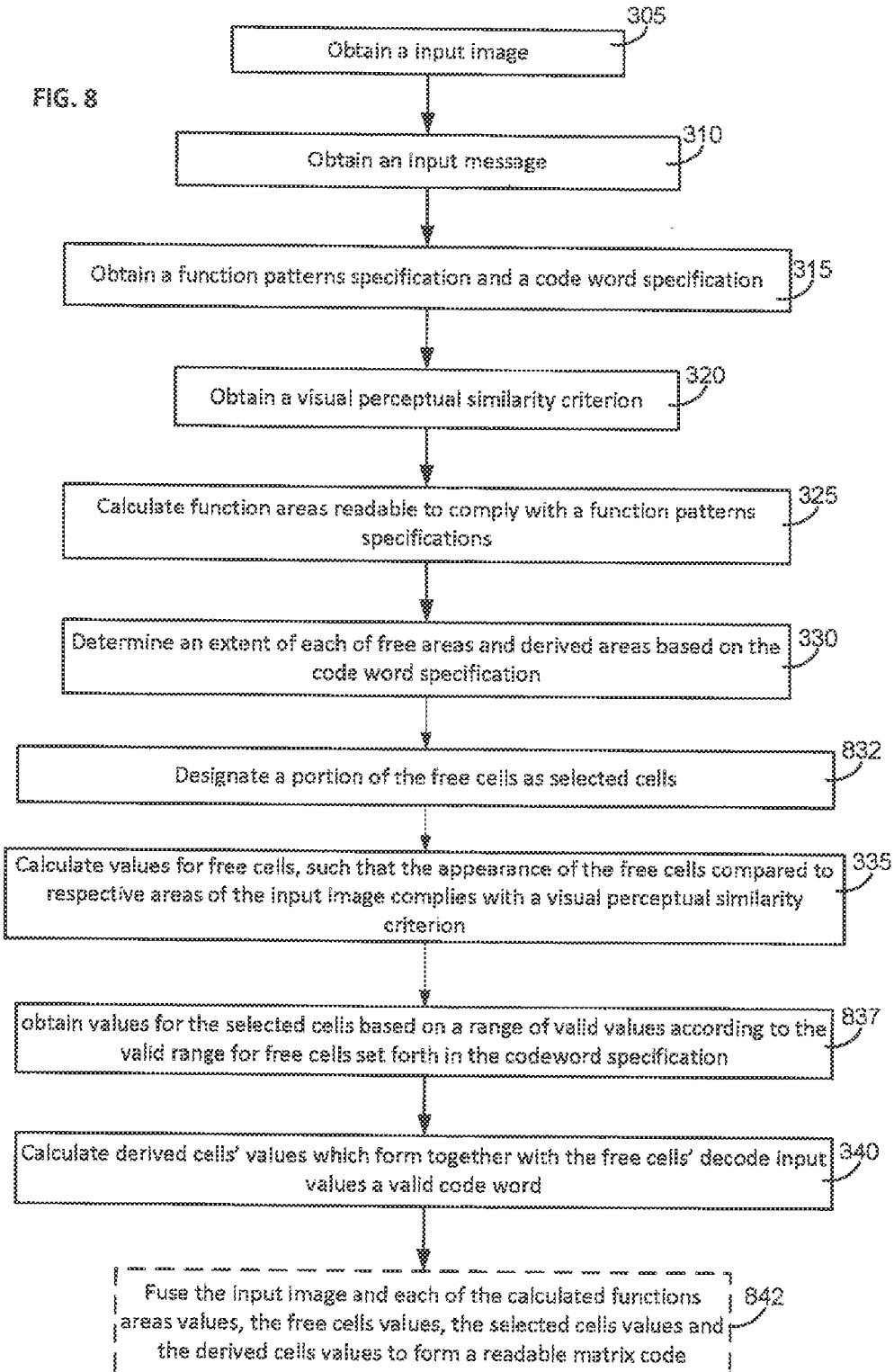
FIG. 8 is a flowchart illustration of a method of generating a readable matrix code representation, according to examples of the presently disclosed subject matter.

Reference is now made to FIG. 8, which is a flowchart illustration of a method of generating a readable matrix code representation, according to examples of the presently disclosed subject matter. In FIG. 8, in addition to the blocks shown in FIG. 3 and which were described at length above with reference to FIG. 3, the fusing process includes designating a portion of the free cells as selected cells (block 832). As mentioned above, the free cells are cells that can receive any valid value according to the readable matrix code specification, and in examples of the presently disclosed subject matter, the values for the free cells are determined based on a visual perceptual similarity to an input image, and specifically by way of example, so as to provide an optimal level of similarity to the input image.

According to examples of the presently disclosed subject matter, the selected cells are specific cells that are selected from amongst the free cells. According to examples of the presently disclosed subject matter, the selected cells can be selected using a saliency criterion. Still further by way of example, a region of certain (e.g., predefined) dimension can be selected using the saliency criterion. Still further by way of example, the region that is selected can be the one that is least salient among the region that is associated with the free cells. However, in other examples, the selected cells can be selected in a different way, for example, the selected cells can be selected manually by an operator.

Still further by way of example, for the selected cells the values are calculated differently from the other free cells. According to examples of the presently disclosed subject matter, the values for the selected cells can be obtained based on the range of valid values for free cells set forth in the code word specification (block 837). The values for the selected cells can be obtained further based on a predefined message that is to be encoded in the selected cells. According to examples of the presently disclosed subject matter, the values which are obtained for the selected cells do not necessarily provide the optimal, or even a high level, of visual perceptual similarity to respective areas of the input image. Still further according to examples of the presently disclosed subject matter, as opposed to free cells, perceptual similarity can be disregarded when the values for the selected cells are obtained. Yet further by way of example, visual perceptual similarity of the selected cells (or of the values for the selected cells) can be evaluated during the fusing operation (block 842), in a manner that is similar to what was described above with reference to FIG. 3 and to FIGS. 4 and 5. In yet further examples of the presently disclosed subject matter, visual perceptual similarity of the selected cells can be evaluated to some extent when the values for the selected cells are obtained at block 837, and this evaluation can be in addition to the implementation of the visual perceptual similarity measures in the fusing operation in block 842.

According to further examples of the presently disclosed subject matter, the values for the selected cells provide a predefined message when decoded. Thus, according to examples of the presently disclosed subject matter, the values for the selected cells can be based on the valid range for free cells set forth in the code word specification, and based on a predefined reference of prefix of a reference. In yet a further example, the values for the selected cells can be selected from amongst a set of predefined references or from a set of predefined prefixes. Still further by way of example, the selection of the reference or the prefix can be made according to a visual perceptual similarity measure. Thus for example, the reference or prefix for which the values for the selected cells provide the best visual perceptual similarity to the corresponding area of the input image is selected and used for generating the corresponding region of the readable matrix code.

According to examples of the presently disclosed subject matter, the predefined message with which the selected cells are associated is a reference to a network resource, such as a URL of a network resource. Still further by way of example, the selected cells provide a prefix of a URL address, and the full URL is a combination of the prefix encoded into the selected cells and the values which are calculated for the free cells. Yet further by way of example, the message encoded in the free cells is a key to a specific resource in a network domain or in a certain area within a network domain that is referenced in the selected cells.

Figure 9:
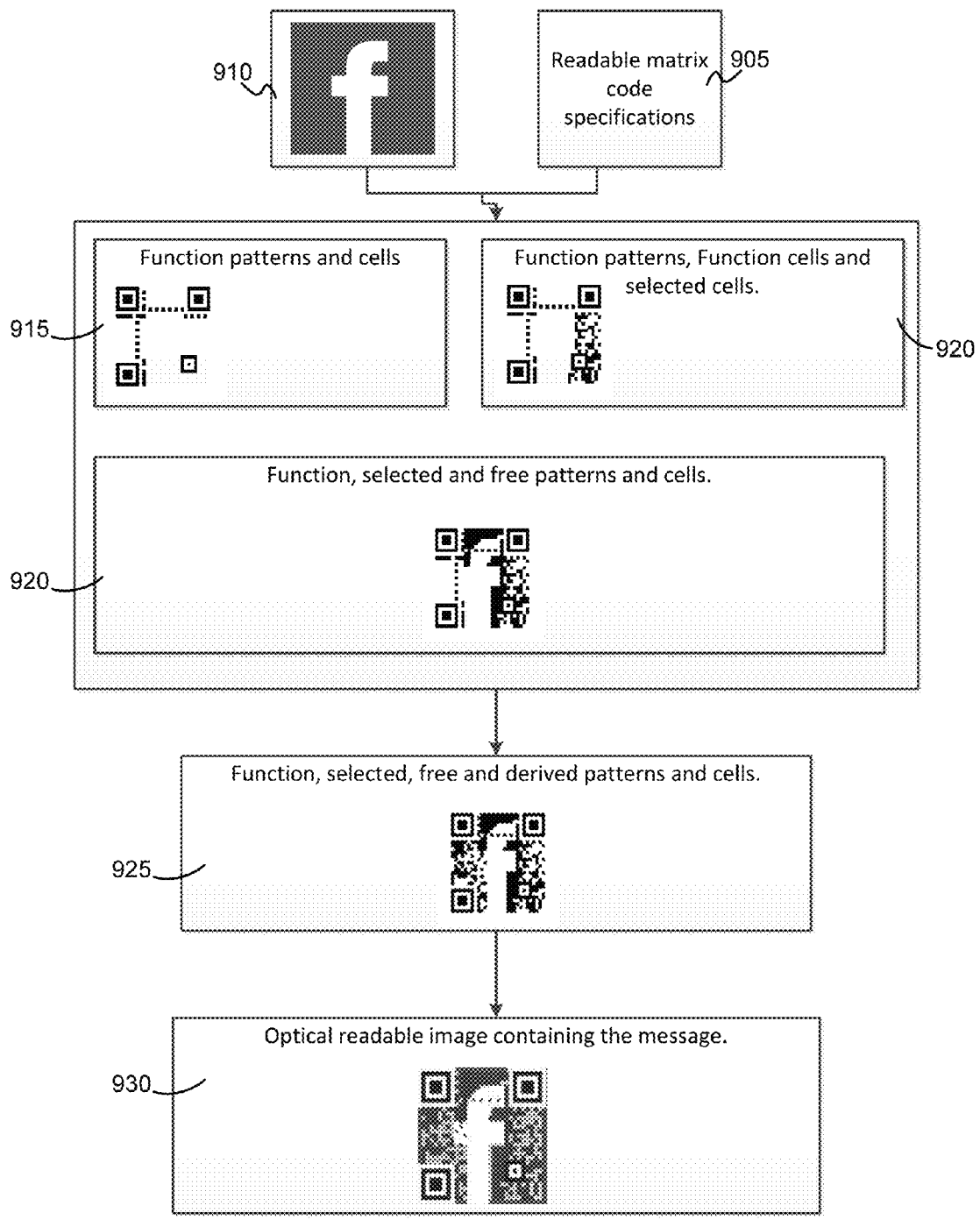
FIG. 9 is a graphical illustration of a process of generating a readable matrix code representation based on the Facebook® logo, according to examples of the presently disclosed subject matter.

Referring now to FIG. 9, there is shown a graphical illustration of a process of generating a readable matrix code representation based on the Facebook® logo, according to examples of the presently disclosed subject matter. The Facebook® logo is a registered trademark of Facebook Inc. As is shown in FIG. 9, the Facebook® logo can serve as the input image 910 in a process of generating a readable matrix code representation according to examples of the presently disclosed subject matter. In addition to the input image 910 a readable matrix code representation 905 can be provided as input. It would be appreciated that the matrix code representation can be preloaded or hardcoded in some examples of the presently disclosed subject matter.

According to examples of the presently disclosed subject matter, in the implementation of the process of generating a readable matrix code shown in FIG. 9, and described herein, initially decode input values are calculated for the function patterns, selected cells, free cells and derived cells, and subsequently the values for the various cells that are used for generating the output image (or the readable matrix code representation) are calculated, based on, inter-alia, the calculated decode input values.

According to examples of the presently disclosed subject matter, as part of the process of generating a readable matrix, and as was described above, function patterns and cells can be computed (block 915). By way of example, block 915 shows a state of a temporary readable matrix code after the computation of the function patterns.

Further by way of example, at block 920, the temporary image includes decode input values for the function patterns and for the selected cells. As mentioned above, the selected cells are selected from the free cells and are used to encode a certain message, for example, a prefix, which by way of example, can be used together with the free cells to form a unique network resource address.

At block 920, the decode input values for the free cells are computed. As can be seen from FIG. 9, the process of generating a readable matrix code according to examples of the presently disclosed subject matter, can take into account in the computation of the decode input values for the free cells a visual similarity to the respective areas in the input image, so as to provide a relatively high level of visual perceptual similarity among certain areas of the input image and corresponding areas in the temporary image (and later in the output image).

At block 925, the decode input values for the derived cells are computed and added to the temporary image.

At block 930, the values for the free cells, the values for the selected cells and the values for the derived cells, and specifically for the pixels associated with each of these cells are computed, and the output image is generated. The output image is readable matrix code representation which can be scanned and processed to provide a valid readable matrix code. As mentioned above, in this case, the readable matrix code representation encodes a certain prefix (e.g, a domain name) and a certain substantially unique key, which together can be used to access a certain network resource (e.g., via an Internet address).

Figure 10:
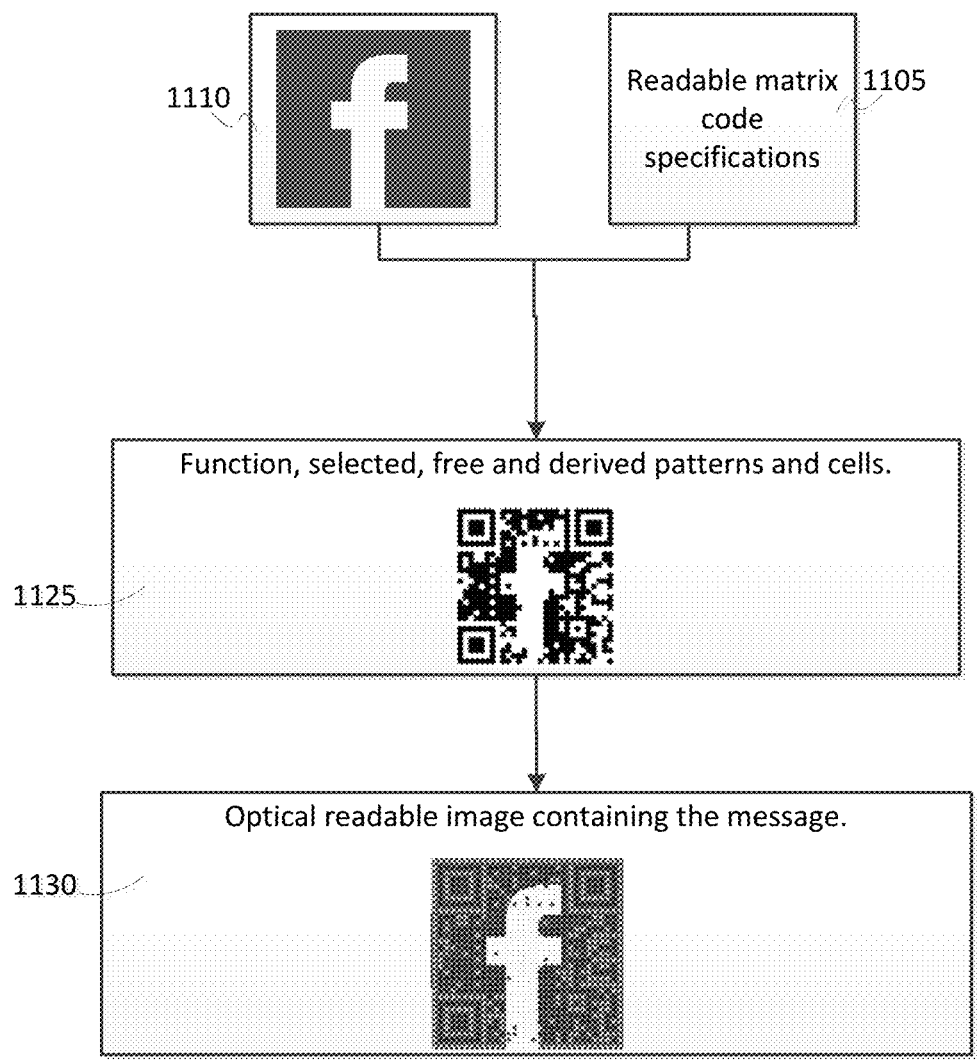
FIG. 10 is a graphical illustration of a process of generating a readable matrix code representation based on the Facebook® logo, according to examples of the presently disclosed subject matter.

Referring now to FIG. 10, there is shown a graphical illustration of a process of generating a readable matrix code representation based on the Facebook® logo, according to examples of the presently disclosed subject matter. The Facebook® logo is a registered trademark of Facebook Inc. The process shown in FIG. 10 uses the same input image 910 (the Facebook® logo) and the same readable matrix code specification 905 as in FIG. 9. Values for the function patterns and cells and values for the selected patterns and cells for the readable matrix code in FIG. 10 are calculated or provided in the same manner as was described above with reference to FIG. 9. The difference between FIG. 10 and what is shown in FIG. 9, and described above with reference to FIG. 9, is that the free cells in block 1025 include data cells and error correction cells, and the derived cells include data cells and error correction cells, whereas in FIG. 9 the free cells are only data cells. A description of an implementation of the process of generating a readable matrix code wherein the free cells include data cells and error correction cells, was described above and can be used to generate the readable matrix code presented in block 1025. Further according to examples of the presently disclosed subject matter, a fusing process can be implemented to produce the readable matrix code representation shown in block 1030.

It should be appreciated that the pixels of the readable matrix code representation can have color values which are visual perceptually similar to the color values of corresponding pixels of the input image, for example, different shades of blue for the Facebook® logo image (the Input image 910), which is predominately blue, where the different shades represent dark/light decode input values of a QR-Code, for example according to the luminosity value of the different shades of blue. It would be further appreciated that the values that are calculated for the free cells, for the derived cells, and for the function patterns in accordance with examples of the method of generating a readable matrix code presented herein, can represent different colors and color shades which are visually perceptually similar to corresponding areas of the input image, the colors and shades computed for the derived cells, and for the function patterns representing dark/light decode input values of a readable matrix code specification (e.g., QR-Code), for example according to the luminosity value of the different shades or colors represented by the calculated values. It would be appreciated that the above is applicable also to other types of cells for which values are computed according to the examples of the method of generating a readable matrix code described herein, including for example selected cells, version cells, metadata cells and padding cells.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A computerized method of generating a readable two-dimensional code encoding an input message and embedding additional information recognizable by a human eye from an input image, the two-dimensional code including function patterns and cells, the method comprising:
   calculating the function patterns; and
   calculating decoded values for the cells based on at least the encoded message in accordance with the additional information, such that an appearance of a portion of the cells in the two-dimensional code is visual perceptually similar to the additional information from the input image.

2. The computerized method according to claim 1, wherein the additional information recognizable by a human eye includes a logo.

* * * * *